(12) United States Patent  
Khedouri et al.

(10) Patent No.: US 9,081,781 B2  
(45) Date of Patent: *Jul. 14, 2015

(54) WIRELESS PORTABLE DEVICE FOR CREATING AND WIRELESSLY TRANSMITTING DIGITAL AUDIO AND/OR VIDEO

(75) Inventors: Robert K. Khedouri, Roslyn, NY (US); Jonathan N. Axelrod, New York, NY (US); Harold E. Price, Bethel Park, PA (US)

(73) Assignee: SanDisk Technologies Inc., Plano, TX (US)

(*) Notice: Subject to any disclaimer, the term of this patent is extended or adjusted under 35 U.S.C. 154(b) by 395 days.

This patent is subject to a terminal disclaimer.

(21) Appl. No.: 13/214,846

(22) Filed: Aug. 22, 2011

(65) Prior Publication Data

US 2011/0304685 A1    Dec. 15, 2011

Related U.S. Application Data

(60) Continuation of application No. 12/041,751, filed on Mar. 4, 2008, now abandoned, which is a division of application No. 10/953,746, filed on Sep. 29, 2004, now abandoned.

(60) Provisional application No. 60/507,110, filed on Oct. 1, 2003.

(51) Int. Cl.  
*H04M 1/64* (2006.01)  
*G06F 17/30* (2006.01)  
(Continued)

(52) U.S. Cl.  
CPC .... *G06F 17/30038* (2013.01); *G06F 17/30053* (2013.01); *G06F 17/30752* (2013.01);  
(Continued)

(58) Field of Classification Search  
USPC ............... 455/413, 41.2; 379/67.1, 68, 88.11, 379/88.16, 88.17, 88.25  
See application file for complete search history.

(56) References Cited

U.S. PATENT DOCUMENTS 4,446,491 A    5/1984    Tidd et al.  
5,179,660 A    1/1993    Devany et al.  
(Continued)

FOREIGN PATENT DOCUMENTS

EP    1 283 487    2/2003  
JP    10304460    11/1998  
(Continued)

OTHER PUBLICATIONS

Office Action for U.S. Appl. No. 11/964,182, dated Mar. 13, 2012, 12 pages.  
Office Action for U.S. Appl. No. 12/041,727, dated Mar. 22, 2012, 20 pages.  
Office Action for U.S. Appl. No. 12/824,683, dated Feb. 29, 2012, 14 pages.  
Office Action for U.S. Appl. No. 11/964,200, dated Apr. 17, 2012, 8 pages.  
(Continued)

*Primary Examiner* — Olisa Anwah  
(74) *Attorney, Agent, or Firm* — Brinks Gilson & Lione

(57) ABSTRACT

A portable wireless communications subscriber audio and/or video player apparatus and system and method for selecting, requesting, downloading, and playing audio and/or video data content files from an Internet-based database server. The wireless link is preferably implemented in accordance with the WiFi protocol, which allows connectivity to the Internet by being in proximity with a local base station or WiFi hotspot (i.e., publicly available local wireless access hub connected to the Internet). The portable wireless communications subscriber audio and/or video player apparatus and system preferably include a security means for monitoring and blocking unauthorized use of the player apparatus and system. The player apparatus further preferably has the capability to communicate with other neighboring player apparatus for the purpose of exchanging content data files, playlists and personal messages.

20 Claims, 17 Drawing Sheets

(51) Int. Cl.
*G06Q 20/20* (2012.01)
*G06Q 30/06* (2012.01)
*H04N 7/173* (2011.01)
*H04N 21/222* (2011.01)
*H04N 21/414* (2011.01)
*H04N 21/472* (2011.01)
*H04N 21/4788* (2011.01)
*H04N 21/61* (2011.01)

(52) U.S. Cl.
CPC .... *G06F17/30761* (2013.01); *G06F 17/30772* (2013.01); *G06F 17/30775* (2013.01); *G06Q 20/206* (2013.01); *G06Q 30/0641* (2013.01); *H04N 7/17318* (2013.01); *H04N 21/2223* (2013.01); *H04N 21/41407* (2013.01); *H04N 21/4788* (2013.01); *H04N 21/47202* (2013.01); *H04N 21/6125* (2013.01)

(56) References Cited

U.S. PATENT DOCUMENTS

| | | |
|---|---|---|
| 5,835,721 A * | 11/1998 | Donahue et al. ............... 709/224 |
| 5,878,351 A * | 3/1999 | Alanara et al. ................. 455/466 |
| 5,905,866 A | 5/1999 | Nakabayashi et al. |
| 6,138,158 A | 10/2000 | Boyle et al. |
| 6,175,860 B1 | 1/2001 | Gaucher |
| 6,208,269 B1 | 3/2001 | Brodie et al. |
| 6,222,909 B1 * | 4/2001 | Qua et al. .................... 379/88.22 |
| 6,230,020 B1 * | 5/2001 | Kantola et al. ................ 455/466 |
| 6,248,946 B1 | 6/2001 | Dwek |
| 6,289,212 B1 | 9/2001 | Stein et al. |
| 6,372,974 B1 | 4/2002 | Gross et al. |
| 6,405,261 B1 | 6/2002 | Gaucher |
| 6,407,680 B1 | 6/2002 | Lai et al. |
| 6,526,411 B1 | 2/2003 | Ward |
| 6,615,212 B1 | 9/2003 | Dutta et al. |
| 6,662,231 B1 | 12/2003 | Drosset et al. |
| 6,697,944 B1 | 2/2004 | Jones et al. |
| 6,721,288 B1 | 4/2004 | King et al. |
| 6,725,460 B1 | 4/2004 | Nishiyama et al. |
| 6,754,470 B2 * | 6/2004 | Hendrickson et al. ...... 455/67.11 |
| 6,757,706 B1 | 6/2004 | Dong et al. |
| 6,763,226 B1 * | 7/2004 | McZeal, Jr. .................. 455/90.2 |
| 6,792,280 B1 * | 9/2004 | Hori et al. ..................... 455/517 |
| 6,799,219 B1 | 9/2004 | Sugahara et al. |
| 6,865,400 B2 * | 3/2005 | Oh et al. ..................... 455/556.2 |
| 6,868,494 B1 | 3/2005 | Shitara et al. |
| 6,883,168 B1 | 4/2005 | James et al. |
| 6,886,036 B1 | 4/2005 | Santamaki et al. |
| 6,941,134 B2 | 9/2005 | White |
| 6,941,324 B2 | 9/2005 | Plastina et al. |
| 6,950,988 B1 | 9/2005 | Hawkins et al. |
| 6,954,763 B2 | 10/2005 | Nunome et al. |
| 6,965,783 B2 * | 11/2005 | Pirkola et al. ............... 455/550.1 |
| 6,990,180 B2 * | 1/2006 | Vuori ......................... 379/88.25 |
| 6,990,497 B2 | 1/2006 | O'Rourke et al. |
| 7,031,931 B1 | 4/2006 | Meyers |
| 7,039,686 B1 | 5/2006 | Arisawa et al. |
| 7,046,998 B2 | 5/2006 | Verma et al. |
| 7,082,298 B2 * | 7/2006 | Enns et al. .................... 455/412.1 |
| 7,085,744 B2 | 8/2006 | Morrison |
| 7,110,838 B1 | 9/2006 | Tada |
| 7,112,138 B2 | 9/2006 | Hedrick et al. |
| 7,124,413 B1 | 10/2006 | Klemm et al. |
| 7,130,892 B2 | 10/2006 | Mukai |
| 7,133,669 B2 | 11/2006 | Nair et al. |
| 7,136,945 B2 | 11/2006 | Gibbs et al. |
| 7,206,559 B2 | 4/2007 | Meade |
| 7,215,923 B2 | 5/2007 | Hillyard |
| 7,275,105 B2 | 9/2007 | Bloch et al. |
| 7,343,384 B2 | 3/2008 | Plastina et al. |
| 7,356,557 B2 | 4/2008 | Kikuchi et al. |
| 7,426,537 B2 | 9/2008 | Lee et al. |
| 7,437,318 B2 | 10/2008 | Yuen et al. |
| 7,469,278 B2 | 12/2008 | Styles et al. |
| 7,471,665 B2 | 12/2008 | Perlman |
| 7,496,353 B2 * | 2/2009 | Odinak ......................... 455/413 |
| 7,500,269 B2 | 3/2009 | Huotari et al. |
| 7,522,675 B2 | 4/2009 | Sheynman et al. |
| 7,533,158 B2 | 5/2009 | Grannan et al. |
| 7,536,175 B2 * | 5/2009 | Lee et al. .................... 455/412.1 |
| 7,587,001 B2 | 9/2009 | Hazani et al. |
| 7,603,434 B2 | 10/2009 | Svendsen |
| 7,627,605 B1 | 12/2009 | Lamere et al. |
| 7,680,941 B2 | 3/2010 | Bloch et al. |
| 7,685,643 B2 | 3/2010 | Lee et al. |
| 7,689,510 B2 | 3/2010 | Lamkin et al. |
| 7,711,838 B1 | 5/2010 | Boulter et al. |
| 7,724,907 B2 | 5/2010 | Candelore |
| 7,725,582 B2 | 5/2010 | Nadarajah |
| 7,730,300 B2 | 6/2010 | Candelore |
| 7,765,326 B2 | 7/2010 | Robbin et al. |
| 7,765,567 B2 | 7/2010 | Candelore et al. |
| 7,769,142 B2 * | 8/2010 | Selbie et al. ................... 379/68 |
| 7,770,226 B2 | 8/2010 | Ahn |
| 7,823,174 B2 | 10/2010 | Candelore et al. |
| 7,836,136 B1 | 11/2010 | Alfke |
| 8,028,038 B2 | 9/2011 | Weel |
| 8,218,737 B2 * | 7/2012 | Odinak .................... 379/88.22 |
| 8,290,903 B2 | 10/2012 | Gulin et al. |
| 2001/0018858 A1 | 9/2001 | Dwek |
| 2001/0023429 A1 | 9/2001 | Barker et al. |
| 2001/0029178 A1 | 10/2001 | Criss et al. |
| 2001/0037256 A1 | 11/2001 | Yazawa |
| 2001/0042107 A1 | 11/2001 | Palm |
| 2001/0047272 A1 | 11/2001 | Frietas et al. |
| 2001/0049733 A1 | 12/2001 | Tokumaru et al. |
| 2002/0035516 A1 | 3/2002 | Arima |
| 2002/0062261 A1 | 5/2002 | Mukai |
| 2002/0065817 A1 | 5/2002 | Ito et al. |
| 2002/0065902 A1 | 5/2002 | Janik et al. |
| 2002/0089942 A1 | 7/2002 | Seppa et al. |
| 2002/0112005 A1 | 8/2002 | Namias |
| 2002/0120501 A1 | 8/2002 | Bell et al. |
| 2002/0138576 A1 | 9/2002 | Schleicher et al. |
| 2003/0014630 A1 | 1/2003 | Spencer et al. |
| 2003/0014767 A1 | 1/2003 | Stumphauzer |
| 2003/0017826 A1 | 1/2003 | Fishman et al. |
| 2003/0018543 A1 | 1/2003 | Alger et al. |
| 2003/0028539 A1 | 2/2003 | Nunome et al. |
| 2003/0031138 A1 | 2/2003 | Beckwith |
| 2003/0050050 A1 | 3/2003 | Higuchi et al. |
| 2003/0069812 A1 | 4/2003 | Yuen et al. |
| 2003/0084075 A1 | 5/2003 | Balogh et al. |
| 2003/0105809 A1 | 6/2003 | Yoshii et al. |
| 2003/0126086 A1 | 7/2003 | Safadi |
| 2003/0126200 A1 | 7/2003 | Wolff |
| 2003/0145093 A1 | 7/2003 | Oren et al. |
| 2003/0182315 A1 | 9/2003 | Plastina et al. |
| 2003/0182559 A1 * | 9/2003 | Curry et al. .................... 713/189 |
| 2003/0191753 A1 | 10/2003 | Hoch |
| 2003/0225834 A1 | 12/2003 | Lee et al. |
| 2003/0236905 A1 | 12/2003 | Choi et al. |
| 2004/0017401 A1 | 1/2004 | Strong et al. |
| 2004/0034624 A1 | 2/2004 | Deh-Lee et al. |
| 2004/0047304 A1 | 3/2004 | Takahashi et al. |
| 2004/0068524 A1 | 4/2004 | Aboulhosn et al. |
| 2004/0073924 A1 | 4/2004 | Pendakur |
| 2004/0087326 A1 | 5/2004 | Dunko et al. |
| 2004/0120688 A1 | 6/2004 | Poltorak |
| 2004/0132438 A1 | 7/2004 | White |
| 2004/0133629 A1 | 7/2004 | Reynolds et al. |
| 2004/0133657 A1 | 7/2004 | Smith et al. |
| 2004/0151136 A1 | 8/2004 | Gage |
| 2004/0158712 A1 | 8/2004 | Lee et al. |
| 2004/0158746 A1 | 8/2004 | Hu et al. |
| 2004/0199657 A1 | 10/2004 | Eyal et al. |
| 2004/0233866 A1 | 11/2004 | Bossoli et al. |
| 2004/0235455 A1 | 11/2004 | Jiang |
| 2004/0261126 A1 | 12/2004 | Addington et al. |
| 2005/0034164 A1 | 2/2005 | Sano et al. |
| 2005/0070259 A1 | 3/2005 | Kloba et al. |
| 2005/0091167 A1 | 4/2005 | Moore et al. |

(56) References Cited

U.S. PATENT DOCUMENTS

| | | | |
|---|---|---|---|
| 2005/0097007 | A1 | 5/2005 | Alger et al. |
| 2005/0102379 | A1 | 5/2005 | Su et al. |
| 2005/0134578 | A1 | 6/2005 | Chambers et al. |
| 2005/0169219 | A1 | 8/2005 | Serpa et al. |
| 2005/0181734 | A1 | 8/2005 | Coutts et al. |
| 2005/0181776 | A1 | 8/2005 | Verma et al. |
| 2005/0193209 | A1 | 9/2005 | Saunders et al. |
| 2005/0243240 | A1 | 11/2005 | Choi et al. |
| 2005/0245240 | A1 | 11/2005 | Balasurya et al. |
| 2005/0256909 | A1 | 11/2005 | Aboulhosn et al. |
| 2005/0262251 | A1 | 11/2005 | Klemets et al. |
| 2006/0004698 | A1 | 1/2006 | Pyhalammi et al. |
| 2006/0008256 | A1 | 1/2006 | Khedouri et al. |
| 2006/0025068 | A1 | 2/2006 | Regan et al. |
| 2006/0031551 | A1 | 2/2006 | Agresta et al. |
| 2006/0041943 | A1 | 2/2006 | Singer et al. |
| 2006/0056324 | A1 | 3/2006 | Hyyppa et al. |
| 2006/0074808 | A1 | 4/2006 | Boesen |
| 2006/0087941 | A1 | 4/2006 | Obradovich |
| 2006/0092966 | A1 | 5/2006 | Sitnik et al. |
| 2006/0114831 | A1 | 6/2006 | Buduma et al. |
| 2006/0123053 | A1 | 6/2006 | Scannell |
| 2006/0129835 | A1 | 6/2006 | Ellmore |
| 2006/0159109 | A1 | 7/2006 | Lamkin et al. |
| 2006/0161635 | A1 | 7/2006 | Lamkin et al. |
| 2006/0190410 | A1 | 8/2006 | Harper |
| 2006/0200440 | A1 | 9/2006 | Choi et al. |
| 2006/0218248 | A1 | 9/2006 | Shiina |
| 2006/0239131 | A1 | 10/2006 | Nathan et al. |
| 2006/0287936 | A1 | 12/2006 | Jacobson |
| 2006/0288112 | A1 | 12/2006 | Soelberg et al. |
| 2007/0011704 | A1 | 1/2007 | Anglin |
| 2007/0077921 | A1 | 4/2007 | Hayashi et al. |
| 2007/0123297 | A1 | 5/2007 | Chan et al. |
| 2007/0150073 | A1 | 6/2007 | Dawson |
| 2007/0177586 | A1 | 8/2007 | Eyal et al. |
| 2007/0180078 | A1 | 8/2007 | Murphy et al. |
| 2007/0207782 | A1 | 9/2007 | Tran |
| 2007/0220552 | A1 | 9/2007 | Juster et al. |
| 2007/0243905 | A1 | 10/2007 | Juh et al. |
| 2007/0288574 | A1 | 12/2007 | Koster et al. |
| 2008/0004978 | A1 | 1/2008 | Rothschild |
| 2008/0114795 | A1 | 5/2008 | Agrawal et al. |
| 2008/0155079 | A1 | 6/2008 | Spiegelman |
| 2008/0222243 | A1 | 9/2008 | Shaw |
| 2008/0250239 | A1 | 10/2008 | Risan et al. |
| 2009/0113536 | A1 | 4/2009 | Zhang et al. |
| 2010/0031366 | A1 | 2/2010 | Knight et al. |
| 2012/0044185 | A1 | 2/2012 | Lapstun et al. |

FOREIGN PATENT DOCUMENTS

| | | |
|---|---|---|
| JP | 2002-163560 | 6/2002 |
| WO | WO 03/034773 | 4/2003 |
| WO | WO 2004/073242 | 8/2004 |

OTHER PUBLICATIONS

Office Action for U.S. Appl. No. 11/964,238, dated May 2, 2012, 13 pages.
Office Action for U.S. Appl. No. 11/964,885, dated Jun. 19, 2012, 12 pages.
Office Action for U.S. Appl. No. 12/045,330, dated Aug. 8, 2012, 19 pages.
Office Action for U.S. Appl. No. 11/964,238, dated Nov. 6, 2012, 12 pages.
Office Action for U.S. Appl. No. 12/045,330, dated Nov. 28, 2012, 16 pages.
Office Action for Canadian Patent Application Serial No. 2,540,178, dated Dec. 19, 2012, 3 pages.
Office Action for European Patent Application Serial No. 10 009 687.4, dated Jan. 8, 2013, 4 pages.
Office Action for European Patent Application Serial No. 10 009 690.8, dated Jan. 8, 2013, 4 pages.
Office Action for U.S. Appl. No. 11/964,238, dated Feb. 28, 2013, 12 pages.
Office Action for U.S. Appl. No. 12/045,330, dated Apr. 3, 2013, 15 pages.
Office Action for U.S. Appl. No. 13/371,936, dated Mar. 14, 2013, 8 pages.
Supplementary Search Report for European Patent Application Serial No. 07 79 9727.8, dated Feb. 6, 2013, 15 pages.
Office Action for European Patent Application Serial No. 10 009 688.2, dated Feb. 28, 2013, 4 pages.
Office Action for European Patent Application Serial No. 10 009 689.0, dated Feb. 28, 2013, 4 pages.
Office Action for U.S. Appl. No. 11/964,182, dated Nov. 2, 2011, 11 pages.
Office Action for U.S. Appl. No. 12/041,727, dated Nov. 8, 2011, 19 pages.
Office Action for U.S. Appl. No. 12/045,297, dated Nov. 22, 2011, 12 pages.
Office Action for U.S. Appl. No. 12/045,910, dated Nov. 28, 2011, 14 pages.
Apple Computer, Inc., "iTunes 4" (Online), Aug. 1, 2003, pp. 1-2, XP002466946, Internet.
Corrected International Search Report and Written Opinion for PCT/US07/73943, dated Jun. 4, 2009, 12 pages.
International Search Report and Written Opinion for PCT/US2007/73943, dated Oct. 16, 2008, 11 pages.
Notice of Allowance for U.S. Appl. No. 11/964,107, dated Jun. 29, 2010, 14 pages.
Office Action for U.S. Appl. No. 10/953,746, dated Apr. 1, 2009, 12 pages.
Office Action for U.S. Appl. No. 10/953,746, dated Jan. 13, 2010, 11 pages.
Office Action for U.S. Appl. No. 11/780,535, dated Apr. 28, 2009, 9 pages.
Office Action for U.S. Appl. No. 11/780,535, dated May 12, 2010, 9 pages.
Office Action for U.S. Appl. No. 11/964,068, dated Oct. 2, 2009, 9 pages.
Office Action for U.S. Appl. No. 11/964,068, dated May 26, 2010, 9 pages.
Office Action for U.S. Appl. No. 11/964,076, dated May 29, 2009, 11 pages.
Office Action for U.S. Appl. No. 11/964,090, dated Dec. 21, 2009, 7 pages.
Office Action for U.S. Appl. No. 11/964,182, dated Jun. 25, 2010, 9 pages.
Office Action for U.S. Appl. No. 11/964,107, dated Jun. 11, 2009, 12 pages.
Office Action for U.S. Appl. No. 11/964,107, dated Dec. 31, 2009, 8 pages.
Office Action for U.S. Appl. No. 11/964,107, dated Sep. 16, 2008, 12 pages.
Office Action for U.S. Appl. No. 11/964,798, dated Dec. 29, 2008, 14 pages.
Office Action for U.S. Appl. No. 11/964,798, dated Sep. 14, 2009, 16 pages.
Office Action for U.S. Appl. No. 11/964,798, dated Jan. 27, 2010, 16 pages.
Office Action for U.S. Appl. No. 11/964,748, dated Apr. 27, 2009, 10 pages.
Office Action for U.S. Appl. No. 11/964,748, dated Mar. 4, 2010, 10 pages.
Office Action for U.S. Appl. No. 11/965,030, dated Jun. 23, 2010, 10 pages.
Office Action for U.S. Appl. No. 11/965,078, dated Sep. 3, 2009, 10 pages.
Office Action for U.S. Appl. No. 12/041,862, dated Apr. 12, 2010, 10 pages.
Office Action for U.S. Appl. No. 12/041,903, dated Apr. 26, 2010, 17 pages.
Office Action for U.S. Appl. No. 12/045,184, dated Dec. 9, 2009, 8 pages.

(56) References Cited

OTHER PUBLICATIONS

Office Action for U.S. Appl. No. 12/045,184, dated Aug. 13, 2010, 8 pages.
Office Action for U.S. Appl. No. 12/045,213, dated May 17, 2010, 9 pages.
Office Action for U.S. Appl. No. 12/045,297, dated Jun. 21, 2010, 15 pages.
Office Action for U.S. Appl. No. 12/045,822, dated Jan. 21, 2010, 13 pages.
Office Action for U.S. Appl. No. 12/045,809, dated Jan. 21, 2010, 13 pages.
Office Action for U.S. Appl. No. 12/045,897, dated Apr. 14, 2010, 13 pages.
European Search Report for European Patent Application No. 04793951.7, dated Feb. 14, 2008, 5 pages.
International Search Report for PCT/US04/32321, dated Apr. 25, 2007, 8 pages.
Office Action for U.S. Appl. No. 11/964,090, dated Aug. 31, 2010, 7 pages.
Office Action for U.S. Appl. No. 11/964,134, dated Aug. 25, 2010, 10 pages.
Office Action for U.S. Appl. No. 11/964,263, dated Sep. 16, 2010, 8 pages.
Office Action for U.S. Appl. No. 11/964,765, dated Sep. 30, 2010, 9 pages.
Office Action for U.S. Appl. No. 12/041,727, dated Aug. 31, 2010, 12 pages.
Office Action for U.S. Appl. No. 12/045,809, dated Sep. 28, 2010, 14 pages.
Office Action for U.S. Appl. No. 12/045,822, dated Sep. 29, 2010, 13 pages.
Office Action for U.S. Appl. No. 12/041,751, dated Oct. 7, 2010, 10 pages.
Office Action for U.S. Appl. No. 11/964,798, dated Oct. 14, 2010, 9 pages.
Office Action for U.S. Appl. No. 12/041,937, dated Nov. 4, 2010, 10 pages.
Office Action for U.S. Appl. No. 12/045,162, dated Nov. 10, 2010, 8 pages.
Office Action for Chinese Patent Application Serial No. 200780027461.6, dated Mar. 17, 2010, 14 pages.
Office Action for Chinese Patent Application Serial No. 200780027461.6, dated Aug. 31, 2010, 12 pages.
Office Action for U.S. Appl. No. 11/964,885, dated Jan. 11, 2011, 9 pages.
"Announcing the New Pocket PC 2002", http://web.archive.org/web/20020124155709/http:/www.microsoft.com/mobile/pocketpc/pocketpc2002/default.asp, 2002, 1 page.
Coats et al., "Streaming into the Future: Music and Video Online", *Loyola of Los Angeles Entertainment Law Review*, Jul. 6, 2000, 24 pages.
"Microsoft Developers—Code with Microsoft", http://msdn.microsoft.com/en-us/default(printer).aspx, printed on Nov. 30, 2010, 2 pages.
Olaru et al., "Speculative TCP Connection Admission Using Connection Migration in Cluster-Based Services", 2004, 8 pages.
"Pocket Outlook—Windows Mobile™ Software for Pocket PC", 2002, 46 pages.
"Tablet Personal Computer", http://en.wikipedia.org/wiki/Tablet_PC, printed on Nov. 30, 2010, 11 pages.
Office Action for U.S. Appl. No. 12/045,297, dated Mar. 3, 2011, 21 pages.
Office Action for U.S. Appl. No. 12/045,330, dated Feb. 17, 2011, 14 pages.
Office Action for U.S. Appl. No. 12/045,910, dated Apr. 4, 2011, 11 pages.
Office Action for U.S. Appl. No. 12/041,727, dated May 11, 2011, 18 pages.
Office Action for U.S. Appl. No. 11/964,263, dated May 25, 2011, 8 pages.
Office Action for U.S. Appl. No. 11/964,182, dated Jul. 12, 2011, 12 pages.
Office Action for U.S. Appl. No. 12/041,937, dated Jul. 18, 2011, 13 pages.
Office Action for U.S. Appl. No. 11/964,885, dated Aug. 3, 2011, 11 pages.
Office Action for U.S. Appl. No. 12/045,330, dated Aug. 2, 2011, 17 pages.
Apple Inc.: "IPOD User's Guide", Sep. 2004, Retrieved from Internet: http://manuals.info.apple.com/en/iPod_Click_Wheel_UserGuide.pdf, retrieved on Sep. 12, 2006, 64 pages.
Decision of Rejection for Chinese Patent Application Serial No. 200780027461.6, dated Aug. 3, 2011, 15 pages.
European Search Report for European Patent Application Serial No. 10009687.4, dated Feb. 3, 2011, 5 pages.
European Search Report for European Patent Application Serial No. 10009688.2, dated Feb. 3, 2011, 5 pages.
European Search Report for European Patent Application Serial No. 10009689.0, dated Feb. 3, 2011, 5 pages.
European Search Report for European Patent Application Serial No. 10009690.8, dated Feb. 3, 2011, 5 pages.
Office Action for U.S. Appl. No. 11/964,263, dated Aug. 22, 2012, 12 pages.
Office Action for U.S. Appl. No. 11/964,182, dated Oct. 1, 2012, 14 pages.
Office Action for U.S. Appl. No. 11/964,200, dated Oct. 10, 2012, 9 pages.
Office Action for U.S. Appl. No. 12/824,683, dated Oct. 11, 2012, 15 pages.
Office Action for U.S. Appl. No. 11/964,182, dated May 21, 2013, 12 pages.
Office Action for U.S. Appl. No. 12/824,777, dated Jun. 14, 2013, 16 pages.
Office Action for U.S. Appl. No. 12/834,515, dated May 22, 2013, 14 pages.
Office Action for European Patent Application Serial No. 11 00 0206.0, dated Apr. 22, 2013, 13 pages.
Notice of Allowance for U.S. Appl. No. 12/045,330 dated Nov. 8, 2013, 7 pages.
Office Action for Canadian Patent Application Serial No. 2,540,178 dated Nov. 18, 2013, 4 pages.
Office Action for U.S. Appl. No. 12/824,777 dated Dec. 12, 2013, 16 pages.
Office Action for U.S. Appl. No. 11/964,238 dated Jul. 24, 2013, 11 pages.
Office Action for U.S. Appl. No. 13/371,936 dated Jul. 18, 2013, 6 pages.
Re-Examination Notification for Chinese Patent Application Serial No. 200780027461.6 dated Jul. 29, 2013, 10 pages.
Office Action for U.S. Appl. No. 11/964,238 dated Dec. 24, 2013, 12 pages.
Office Action for U.S. Appl. No. 12/834,515 dated Oct. 29, 2013, 15 pages.
Office Action issued in U.S. Appl. No. 12/824,777, mailed May 19, 2014, 15 pages.
Office Action for U.S. Appl. No. 13/371,936 dated Mar. 21, 2014, 8 pages.
Office Action for U.S. Appl. No. 13/371,936 dated Jul. 11, 2014, 8 pages.
Office Action for U.S. Appl. No. 12/824,777, dated Oct. 1, 2014, 15 pages.
Restriction Requirement for U.S. Appl. No. 11/964,200, dated Jan. 31, 2012, 6 pages.
Office Action for U.S. Appl. No. 11/964,238 dated Dec. 21, 2012, 11 pages.
Office Action for U.S. Appl. No. 12/045,330, dated Feb. 16, 2012, 14 pages.

\* cited by examiner

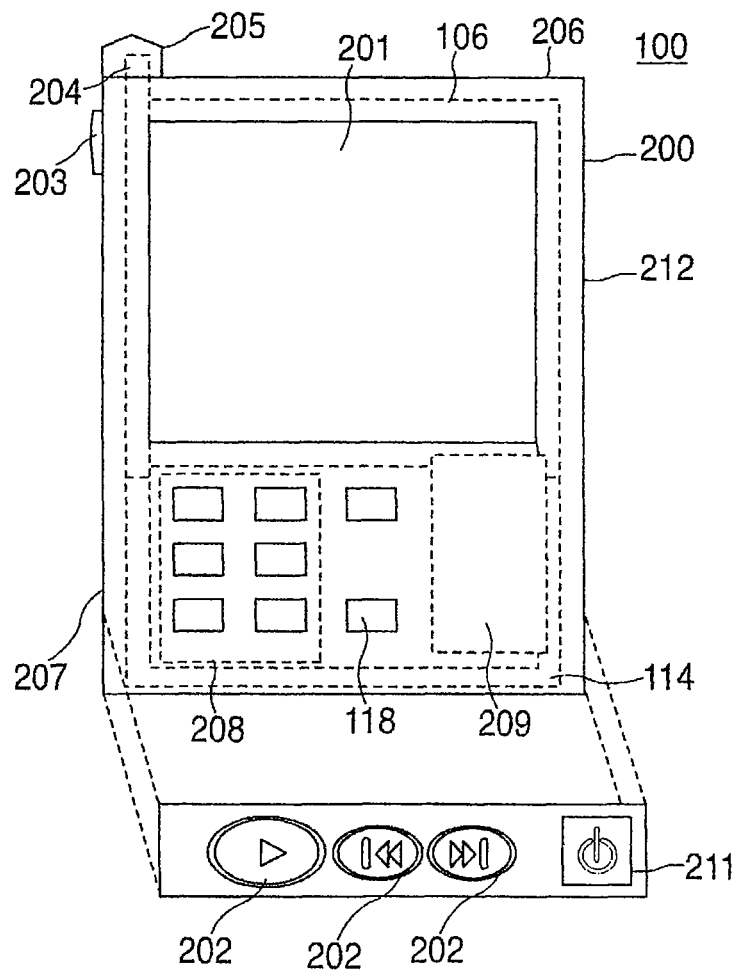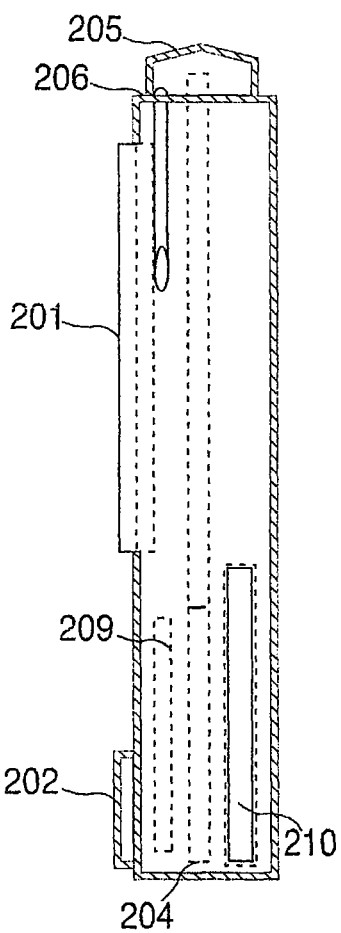
FIG. 2
FIG. 2A

WIRELESS PORTABLE DEVICE FOR CREATING AND WIRELESSLY TRANSMITTING DIGITAL AUDIO AND/OR VIDEO

CROSS-REFERENCE TO RELATED APPLICATIONS

This is a continuation of U.S. patent application Ser. No. 12/041,751, filed Mar. 4, 2008 now abandoned, which is a divisional of U.S. patent application Ser. No. 10/953,746, filed Sep. 29, 2004now abandonded, which claims priority to U.S. provisional patent app. No. 60/507,110, filed Oct. 1, 2003, each of which is hereby incorporated by reference.

BACKGROUND OF THE INVENTION a. Field of Invention

The present invention relates to the field of digital audio and video player devices that are preferably portable and receive content either from a secure subscription-based or "a-la-carte" content delivery service or from other participant devices, and more particularly to a portable player apparatus that is in wireless communications with an Internet-based file server and laterally to a peer player apparatus. The present invention also relates to a system and method for delivery and management of such content to such devices.

b. Description of the Prior Art

The development of compressed digital audio and video formats, such as the Motion Picture Experts Group—Layer 3 (MP3) audio compression standard, MPEG 21, Advanced Audio Coding (AAC), ATRAC, WMA, FLAC, Ogg-Vorbis and others enabled the growth in popularity of recording, storing, transferring, and playing back digital audio and video data on computers, including personal desktop and laptop computers. In particular, compressed digital audio and video formats enabled more efficient storage and transmission of high-quality audio and video content by reducing the amount of digital data that needed to be stored and transmitted, resulting in data files that could be smaller than 1/10th of the original uncompressed digital file without unacceptably degrading the quality of the output. However, due to computational requirements, consumers were generally only able to access and use compressed and uncompressed digital audio and video on their personal laptop and desktop computers (except for conventional commercially-sold pre-recorded CDs and DVDs, which were playable on standard players connected to home stereos and the like). This severely limited portable use and access to such digital audio and video content in that it required the user to be present at or near his or her computer to see and/or hear the playback, which typically could only be through speakers and/or a screen internal to or connected to the computer and not easily transported in digital format to more favorable listening environments, such as the user's car.

More recently, relatively low-cost, lightweight, compact, portable digital media players ("DMPs") have been developed, e.g., Rios' Karma MP3 player, and Creative's Portable Media Center. These portable devices enable consumers to transfer compressed digital audio and/or video files stored on their computers to the portable devices through the use of associated computer-based software via an external connection, such as a USB or "FireWire" cable, and to play the corresponding media on-demand through their DMPs while not in proximity to their computer. Users most commonly accessed the audio on the device by connecting headphones via a standard jack on the device, although it was also possible to connect a line-out cable to other audio output or recording devices, such as a microphone- or line-input of a standard home stereo system.

Such DMPs originally tended to rely on the use of flash memory, such as compact flash or secure digital, for the storage of audio content, and were capable of holding a maximum of approximately 0.5 to 1 gigabyte of memory. More recently, so-called "portable jukeboxes" have been introduced that can hold an estimated 10,000 songs or more of musical entertainment by including a miniature hard disk recorder in the housing of the device, which can have 40 gigabytes or more of capacity. Portable video players with even greater hard disk capacity have also been developed.

In general, conventional DMPs are capable of allowing their users to (1) transfer compressed media files from a computer to the device through the use of associated transfer management software installed on the computer and a physical connection to the computer, such as a USB cable; (2) store such compressed media files in non-destructive memory; (3) decode for playback any of a variety of compression algorithms; (4) convert a compressed or uncompressed digital file to an analog format, potentially also processing the signal to enhance the resulting sound and images; (5) process and amplify the resulting analog signal; and (6) produce high-fidelity sound and video for the user, which may be played, paused, fast-forwarded, rewound, skipped or replayed instantly and on-demand. Also, typically in the case of audio DMPs (e.g., the Rio Karma), the devices feature a relatively small digital display window that provides information regarding the audio content stored on the device, such as the title and artist, and enables viewing (and in some cases modifying) the sequence of the audio tracks that are currently stored on the device.

Disadvantageously, however, data transfer and advanced sorting and sequencing of selections are difficult or impossible for a user to accomplish unless the DMP is connected to the computer, which does not allow the user to obtain new content or to make other desirable modifications to the content stored on the DMP, such as easily modifying the sequence of the content selections stored on the device while the player device is not connected to the computer. Further, in the case of audio, these players typically do not enable a non-technical user to create and manage custom "playlists" (i.e., fixed song sequences), such that a user can easily develop and use a variety of personalized playlists for use at different times. Also disadvantageously, the display and user interface on these audio devices is typically limited in size, involves the use of multi-functional buttons which are complex for many users and is not touch-sensitive, thereby preventing non-expert users from easily viewing and modifying the listing and sequence of audio tracks stored on the DMP.

A further disadvantage of the prior art is that users are typically required to select content selections one-by-one and then to add them to the device. Such requirement creates an inconvenience for the user since typically the user may prefer variety in the programming, and in many cases may not want to create a selection-by-selection sequence of entertainment, especially in the case of music. Programmed entertainment of this sort is currently available to consumers through traditional broadcast media and through other means that generally require the use of a device connected to a wired input, such as Internet-based streaming, accessible through laptop and desktop computers (and certain specialized wired devices, such as the Streamium audio device made by Royal Philips Electronics), and digital cable television and radio services, accessible through cable-connected television sets. More recently, subscription-based commercial satellite broadcast services have been introduced, such as DirecTV for television and Sirius and XM for radio, which enable consumers to receive hours of programming by selecting among available stations.

However, in all cases involving terrestrial and satellite broadcasts, the user does not have the control to stop, start, rewind, fast-forward, replay or skip any portion of the programming. Also, neither terrestrial and satellite broadcasts, nor Internet-based media services allow the user to call up and access specific new selections on-demand on a portable device that does not have full PC functionality (e.g., a lap top) and is not connected to a wired Internet connection. Accordingly, for the convenience of receiving programming with existing DMPs, the user is required to cede control over delivered content for convenience, or will be required to choose to cede convenience for control. Further, in the case of radio-linked audio player devices, player device reception is typically limited due to physical terrain and geographic features, which can distort radio signals that in all cases need to be continuously present and stable during the audio output to provide the user with a satisfactory entertainment experience. Further, of the forms of media services (e.g., TV and radio) available, only Internet-based streaming and digital cable, each of which require the user to use a stationary wired-device for access (e.g., television set and digital cable decoding box), and satellite broadcasts, which do not permit on-demand access or control by the user, provide digital-quality output, which may be a benefit required by users.

A further disadvantage of the prior art is that a security method is not provided for content owners to enable distribution of content to users, management of the content and deletion/expiration of their content on a subscription basis using only a standalone DMP that is not reliant on the use of associated desktop or laptop computer software, while still maintaining royalty records and rights, especially against secondary party transfers. Content owners and users would also benefit from a way content can be shared laterally across peer-to-peer device transfers to other users of both the personal playlists and the media data content that may be stored in the player device in a way that is secure and that permits only authorized sharing activities. It can be appreciated by one having ordinary skill in the art that the terms "audio", "video", "media", and words of similar import may be used interchangeably throughout this document to describe the relevant content, since methods of digital video content compression, storage, transfer, playback and control can be accomplished by using very similar methods and technologies and are similarly well-known by those skilled in the art. Note that "content," as used in this document, shall accordingly mean any audio or video recording that a user may seek to access, and also shall include any other file type capable of being interpreted by a user, such as a written document stored in digital form or a digitally stored and compressed photograph, which may be similarly transferred, shared and used.

SUMMARY OF THE INVENTION

The present invention addresses the problems with the prior art described above. A preferred embodiment of the present invention consists of a portable wireless audio and/or video player apparatus having one or more of the following elements: a peer-to-peer audio and/or video data transfer module to allow communications with another wireless audio and/or video player apparatus; a wireless communication link to an Internet-connected base, a communication software module for requesting one or more audio and/or video data files from an Internet-based database server via the Internet-connected base station; a first security means for enabling the downloading and storage of the requested files; a second security means for the management and playing of the stored files; and one or more software modules for interfacing with a user to effect the foregoing features using a easy to understand interface.

More specifically, the player apparatus according to the present invention is able to function as a standalone device to generate, search and obtain new audio and/or video digital data files (containing content and associated metadata (as defined below)) wirelessly over the Internet, without the need to use an intervening device, such as a desktop or laptop computer that temporarily stores the content data files to be transferred to the portable device, or software that runs on a laptop or desktop computer to manage the transfer and arrangement of content on the portable device. This feature enables a non-technical user to access and use digital audio and/or video content without knowledge of how to operate a computer. Further, to overcome the limitations of the display interface of the prior art, the user interface software according to embodiments of the present invention is designed to enable more complex user functions and data organization, and to display these simply and clearly. Such user interface software permits the device to reasonably and comfortably function for the user as a standalone device while permitting the user to search for new content, manage and modify large volumes of content, and share content across a large number of potential users who may be listed by user ID or name. Moreover, the device obtains files from a server or laterally from another device without using a browser-type application.

It is also a feature of the embodiments of the present invention to provide the user with a flexible programming capability both as to time and selection for the playing of the individual audio and/or video files or groups of files. This includes allowing a user to select and play individual content selections from a broad content library stored in a network on-demand, and alternatively to request that hours of continuous programmed content be playable on demand, which programming will be updated on a periodic basis (e.g., daily), without limiting the user's ability to start, stop, rewind or fast-forward through the program.

It is also a feature of the embodiments of the present invention to provide a means for exporting the data content to one or more of a plurality of output devices, including headphones or a home or car stereo, or another storage and/or playback apparatus such as a desktop or laptop computer. Such export may be via either a wired or a wireless communications link.

It is a feature of the embodiments of the present invention to provide a portable player apparatus that is not dependent on favorable physical terrain and geographic features that are typically associated with wireless communications devices. This is mainly accomplished by the pre-storing of desired audio and/or video data and metadata content while in the presence of a communications uplink for accessing/playing at a later time, at which time a continuous wireless connection is not required for navigating the metadata database or for a satisfactory output of the stored audio and/or video content.

It is a feature of the embodiments of the present invention to provide a secure method for content owners to enable distribution of their audio and/or video content to mass-market consumers on a subscription basis.

In a preferred embodiment according to the present invention, a media distribution system preferably consists of a broadband network system for wirelessly distributing digital media files to multiple standalone portable digital media player devices in which the devices are: (1) dedicated to and optimized for searching for, receiving and playing audio and/or video files, authorized obtainment from a network or peer device, management and search of metadata and media content (even while no network or Internet connection is present), authorized playback and authorized transfer (such as to a peer device or digital computer) of digital audio and/or video files by a user; (2) capable of wirelessly transmitting and receiving audio and/or video data files at "broadband" speeds via conventional broadband protocols, such as that promulgated in the 802.11 standard, both to and from a local network which preferably includes Internet connectivity; and (3) able to communicate with an application service in order to request and download encrypted audio and/or video content and associated metadata. Each portable player device preferably includes at least a first security means that disables playback and transfer of media files, or that selectively enables such playback and transfer when a subscription service is activated. The media distribution system preferably includes one or more Internet-based database servers wherein are stored digital audio and/or video data content in compressed or uncompressed form and associated metadata (i.e., descriptive or associative data concerning the content—in the case of audio, this may include such items as length of track, name of artist, name of song, name of album, encoding format and bit rate), an Internet application server interface that communicates individually with each portable device via a secure certification/authentication link, an upload manager that ensures the secure and efficient delivery of data content files to each of the portable devices, and the communications network, thereby allowing the user to request, download, and store individual titles, groups of titles (i.e. a playlist,) and/or preprogrammed entertainment that fit particular criteria (such as genre or purpose (e.g., work-out, dancing)) on a periodic basis.

The audio and/or video content may be distributed to the portable player devices in encrypted form, capable of being played only when decrypted with a particular private digital decryption key. The portable player device (or apparatus) is preferably constructed with an internal clock that is not settable or re-settable by the user (which is a necessary part of preventing a user from avoiding the expiration and disablement of content for time-based subscriptions), but rather can only be digitally set by establishing a secure and authenticated connection to a secure subscriber network that provides it with accurate time and date information. The portable player device preferably also includes a monitoring module that records the time and date each time a content selection is played or transferred by the device. The monitoring module also preferably includes a reporting module for transferring the monitoring results to the network (via the network's upload manager) when connection is made between the portable player device and the network for any reason.

In a second embodiment according to the present invention, a portable peer-to-peer wireless communication player device for transferring audio and/or video and related files to and from a second portable peer-to-peer wireless communication player device, the portable peer-to-peer wireless communication player device preferably comprises: a wireless transceiver unit for wirelessly communicating with external devices (such as peer devices and digital computers); an audio output unit for playing audio files; a visual output unit for displaying video and/or displaying user interface information (e.g., LCD screen or other existing or hereafter created output technology, which, in the case of user interface information, may also be replaced (as is familiar to those experienced in the art) with a menu-driven audio output means); a controlling computing unit having a user input interface and a microprocessor; a digital storage means for storing digital data; and an included software method for operating the device, wherein the digital data preferably includes audio and/or video data content and playlists. Further, the audio output unit preferably includes one or more from the group consisting of speakers and headphones, and the user input unit may consist of one or more from the group consisting of buttons, keys, joysticks, toggles, switches, keyboards, touch-pads and touch-sensitive screen locations, which may include infrared, resistive, inductive and capacitive sensing means. The software may include one or more of the following modules: a communications module; a processing module; a security module; a user interface module; a resident database management module; a storage and retrieval module; and a play module.

The user input interface of the second embodiment preferably includes a set of interactive screens displayed on the video output device, further including: the steps required for selection of one or more titles in response to screen display pages in order to generate a content request list for transmitting to the audio and/or video content distribution center upload manager and database. The security module preferably includes means for interaction with upstream base station to enable the operation of the portable peer-to-peer wireless communication player device; interaction with at least one second portable peer-to-peer wireless communication player device; and expiration of audio and video content files according to a set of subscription and usage rules that may be modified through programmed changes at the network. Such rules may include, for example, prohibition on playing any subscription-based content resident on the portable device unless the network has authenticated and validated the subscription on the device within the past 30 days.

In a third embodiment according to the present invention, a portable peer-to-peer wireless communication player device for generating and wirelessly transmitting a playlist to local base station having an Internet connection to an Internet-based database server, and receiving an associated plurality of audio and/or video data content files, preferably comprises: a portable peer-to-peer wireless communication player device as in the second embodiment communicatively coupled to an Internet-based database server via a local wireless base station. In the third embodiment, the wireless communications are preferably accomplished using a WiFi protocol. The Internet-based database server: distributes stored audio and/or video content files in response to playlist transmission request after first verifying that the requesting device has an authorized subscription; sends re-enabling messages to the requesting device to reset a local security module to generate a first enabling action; sends disabling messages to the requesting device to cause the local security module to generate a disabling action if the device does not have an authorized subscription.

In a fourth embodiment according to the present invention, a secure subscription-protected communications system for distributing audio and/or video data content to a portable peer-to-peer wireless communication player device, preferably comprises: 1) a portable peer-to-peer wireless communication player device that generates a content request list via an interactive user interface or by automatically determining a list of one or more selections the user desires but which are not currently stored on the device (e.g., based on a preferred sequence of songs or videos the user has compiled (a "playlist"), only some of which are currently stored on the portable device); transmits the content request list to a local base station; receives and stores associated audio and/or video files transmitted from the local base station; transmits to and receives from, on-demand or in an automated fashion, content files from other peer-to-peer devices; displays a list of available content on the device to its user, as well as to other users who establish a wireless connection with the device; displays a list of possible content choices, even if not resident on the device, to the user; enables management of a large quantity of digital content, including the development and modification of custom playlists; plays audio and/or video files in response to user selection, if the subscription is valid; and expires content if the subscription is invalid, such that the user is not able to play the content on the device; 2) the local base station receiver that receives the content request from the peer-to-peer portable wireless communication player device; and transmits the received request to an Internet-based database server via the Internet communication link; 3) the Internet-based database server that: stores and manages a plurality of audio and/or video files that are accessible by inputting associated titles or file IDs; tracks subscription information (e.g., such as access rights and expiration timing) for a plurality of portable peer-to-peer wireless communication player devices; tracks artist proprietary material and rights; tracks usage of proprietary material on each one of the portable peer-to-peer wireless communication devices; receives the content request list from the local base station via an Internet communications connection; retrieves selected audio and/or video files indicated by the received playlist; transmits the selected audio and/or video files to the local base station for re-transmission to the portable peer-to-peer wireless communication player device; and 4) a local base station transmitter that receives transmitted audio and/or video files from an upstream database server via the Internet communication link and re-transmits the received audio and video files to the requesting portable peer-to-peer wireless communication player device.

In a fifth embodiment according to the present invention, a secure subscription-protected media distribution system for distributing audio and/or video content files to a portable peer-to-peer wireless communication player device in response to a received playlist, preferably comprises: 1) a peer-to-peer wireless communication device that: generates a user content request list via an interactive user interface (or in an automated fashion based on user preferences that the user pre-selects, and/or a predetermined set of rules or other criteria); transmits the generated request list to a local base station; receives and stores associated audio and/or video files transmitted from the local base station; plays audio and/or video files in response to user selection, if subscription is valid; and expires content from memory if the subscription is invalid; 2) the local base station receiver that receives request from the portable peer-to-peer wireless communication player device and transmits the received request to a database server via the Internet communication link; 3) the database server that: stores and manages a plurality of audio and/or video files that are accessible by inputting associated titles or file IDs; tracks subscription information for a plurality of portable peer-to-peer wireless communication player devices; tracks artist proprietary material and rights; tracks usage of proprietary material on each one of the plurality of portable peer-to-peer wireless communication devices; receives the content request list from the local base station via an Internet communications connection; retrieves selected audio and/or video files indicated by the received playlist; and transmits the selected audio and/or video files to the local base station for re-transmission to the portable peer-to-peer wireless communication player device; and 4) a local base station transmitter that receives transmitted audio and video files from upstream database server via the Internet communication link and re-transmits the received audio and/or video files to the requesting portable peer-to-peer wireless communication player device.

In a sixth embodiment according to the present invention, a wireless communications system for selecting, downloading and playing audio and/or video data content using a wireless protocol which, in the present embodiment may be based upon the 802.11 (or similar) standards and related technologies (referred to herein, along with other wireless technologies now existing or hereafter developed which may be substituted, as "WiFi"), preferably comprises: a subscription-based database server further including: a first Internet connection; a plurality of audio and/or video data content files; and a translation and retrieval means for defining and downloading a unique one of the audio and/or video data content files in response to an inputted title or file ID selection request. The wireless communications system also preferably includes: a local WiFi base station, which has a second Internet connection in communication with the first Internet connection; and a portable wireless communication subscription-capable player device, which further includes: a selection means for generating at least one title or file ID selection request; and a WiFi transmission means for transmitting the first title selection request to the local base station and thence to the database server; a WiFi receiving means for receiving the audio and/or video data content file downloaded in response to the transmitted title selection request; and a playing means for playing the downloaded audio and/or video data content file.

The portable wireless communication subscription-capable player device of the sixth embodiment preferably further includes a security unit for controlling the operation of the unit in responsiveness to at least one subscription status indicator. The selection means of the portable wireless communication subscriber player device may further include a display unit and a user input means, which may further include at least one from the group consisting of a button, a touch-pad location on the display unit, a joystick, a toggle, a key, a keyboard and a voice recognition input means.

The portable wireless communication subscriber player device of the sixth embodiment preferably further includes a communication means for wirelessly connecting with a second portable wireless communication subscription-capable player device for the purpose of transferring data between the two devices using the WiFi protocol. The portable subscriber wireless communication subscription-capable player device preferably includes means for selecting, downloading and playing audio and/or video data content (or, per the current definition of "content," any other data files) using a WiFi protocol, comprising: a selection means for selecting at least one from a displayed list of audio and/or video titles and generating at least a first title selection request; and a WiFi transmission means for transmitting the first title selection request to a local base station and thence to a database server; a WiFi receiving means for receiving the audio and/or video data content file downloaded in response to the transmitted title selection request; and a playing means for playing the downloaded audio and/or video data content file. The portable wireless communication subscription-capable player device of the sixth embodiment preferably further includes a security unit for controlling the operation of the unit in response to at least one subscription status indicator.

BRIEF DESCRIPTION OF THE DRAWINGS

FIG. 2 shows a plan view of the device of FIG. 1;

FIG. 2a shows a side view of the device of FIG. 2;

FIGS. 9 and 10 show a representative second user interface screen for making selections according to one embodiment;

DETAILED DESCRIPTION OF PREFERRED EMBODIMENTS OF THE INVENTION

Figure 1:
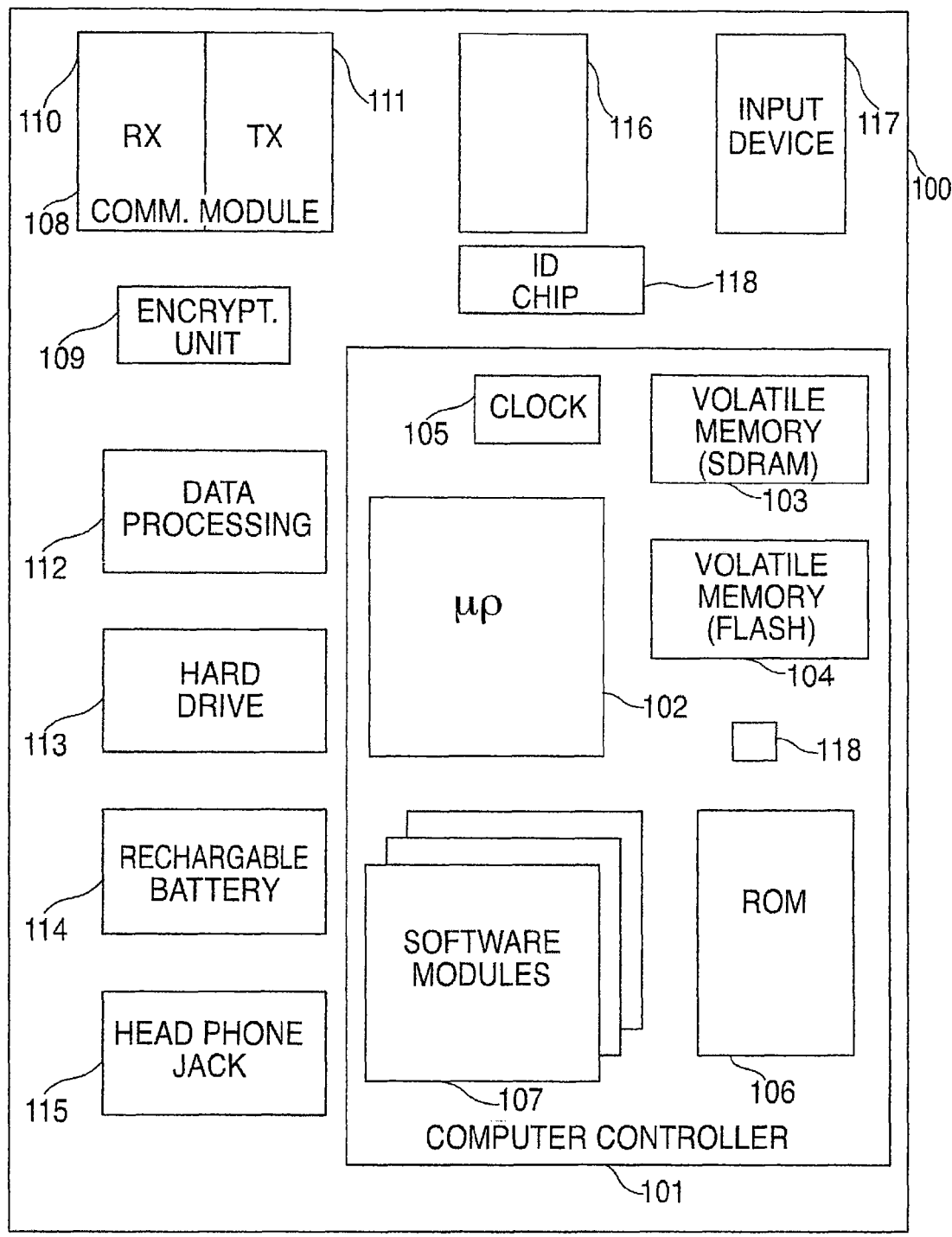
FIG. 1 shows a block diagram of the elements of a portable player device constructed in accordance with this invention.

Hereinafter, the present invention will be described in detail by describing preferred embodiments of the invention.

In a preferred embodiment according to the present invention, a digital media distribution system consists of: a broadband network system for wirelessly distributing digital audio and/or video files to multiple standalone digital playback devices that are: (1) dedicated to and optimized for the search, procurement, storage, management, playback and control of digital audio and/or video files by a user from the network; (2) capable of wirelessly transmitting and receiving audio and/or video data files at "broadband" speeds via conventional broadband protocols, such as that promulgated in the 802.11 standard, (preferably 802.11 g or other similar standards) both to and from a local network which can include Internet connectivity and connectivity to one or more compatible devices without Internet connectivity (e.g., using a WiFi network in an ad hoc mode); and (3) able to communicate with an application service in order to request and download encrypted audio and/or video content and associated metadata. The devices are preferably portable. The present invention preferably contemplates a means by which the portable player device can connect to the application service and digital data referred to above through at least one of a number of alternate means, including preferably a docking cradle (described below) connected to the Internet and/or a WiFi access hub providing access to the Internet and is wirelessly linked to the portable player unit. In one embodiment, each portable wireless communication player device preferably includes at least one security means that disables playback and distribution of audio and/or video files upon application of a first triggering signal, or that enables such playback and distribution upon application of a second triggering signal when a subscription service is activated. The music distribution system preferably includes one or more Internet-based database servers used to store digital audio and/or video data content in compressed or uncompressed form and associated metadata (as described above). An Internet application server interface is also provided that communicates individually with each portable device via a secure certification/authentication link. In addition, there is an upload manager that ensures the secure and efficient delivery of audio and/or video data content files to each of the portable devices, and the communications network. The user may request individual titles, groups of titles (i.e., a playlist,) and/or preprogrammed audio and/or video entertainment that fit particular criteria (such as genre or purpose (e.g., work-out, dancing)) on a periodic basis.

The system according to the present invention provides a secure method of audio and/or video content distribution due to (i) creation of a secure platform for the distribution of audio and/or video content that cannot easily be used by users to impermissibly share such content, (ii) use of direct security, encryption and digital rights management technologies, and (iii) alteration of the incentives of users to illegally obtain or copy content, which is potentially damaging to content owners, by providing a way they can search for and obtain new content, transfer the content to a portable device, listen to and/or view the content through a variety of output devices (such as headphones or a car or home entertainment system), and share the content with friends and other users. Such security method overcomes disadvantages in current applications in which users are required to use a laptop or desktop computer to perform these functions. Laptop and desktop computer-based systems inherently encourage users to create additional copies of content in order to transfer it to a more desirable listening/viewing environment and also make it easier for them to use illicit file sharing and download services which are merely a "click away." By delivering content to a portable device that can easily be carried in a pocket, that enables sharing with friends and that enables listening and/or viewing through a wired or wireless connection to headphones, a car stereo or television, a home entertainment system or another desired output device, a user has less incentive to burn a CD or DVD, or make other kinds of copies of such content, including activities that may constitute copyright violations.

In addition, the method simultaneously provides a user with an enhanced entertainment experience by (a) not requiring the use of a computer, which is in many ways inconvenient for users, (b) wirelessly providing content to users so that they are able to obtain and enjoy new audio and/or video selections without connecting wires to a device, without being in their homes or offices, and without the inconvenience of visiting a retail store, and (c) enabling new capabilities for the user, such as wirelessly sharing content with other users in a legal fashion that does not infringe on the property rights of the content owners. The user interface of a preferred embodiment, if based on a touch-screen or similar input technique, is optimized to allow a user to input all selections without using a stylus, but rather by using a fingertip. This is achieved by ensuring selection areas on each screen displayed to the user is sufficiently large to accommodate and accurately reflect the position of an average user's fingertip on the touch-screen. The user interface of a preferred embodiment, if not based on a touch screen or similar input technique, is optimized to allow a user to input all selections by using a toggle, joystick, touch-sensitive mouse pad, roller ball or similar input method to sequentially highlight the various selection options on each screen and to select the desired option. A user interface might also feature, using any of the above input methods, a conventional drag-and-drop functionality to allow users to create and modify the sequential listings of content selections and to thereby store and manage a library of playlists, which is not part of the prior art for DMPs.

Thus, a representative embodiment of a portable digital audio playback device 100 according to the present invention, as shown in FIG. 1, preferably includes the following electronic modules: a computer controller 101 for controlling the operation of the portable player device, which further preferably includes a microprocessor 102, such as an ARM processor, volatile memory 103, such as SDRAM, non-volatile memory 104, such as flash, a non-resettable internal clock 105, Read-Only-Memory (ROM) 106, a plurality of software modules 107 for managing the operation of the computer controller, an uplink/downlink communications link, a peer-to-peer communications link, and interactive security processing and further containing a unique electronic identification or serial number of the portable player device; a communications module 108 further comprising an encryption unit 109, a receiver unit 110 and a transmitter unit 111 that preferably conforms to the protocols of WiFi; a data processing unit 112; a mini-hard disk drive 113, preferably having a data capacity of at least 1 gigabyte; a rechargeable battery 114, such as lithium polymer; and a headphone/line-out connector jack 115.

In FIG. 2 the device 100 has a housing 200 with a user interface display that is preferably a liquid crystal display (LCD) 201, which may be monochrome or color, capable of displaying at least 5 lines of English text, with or without a touch-sensitive layer (e.g. resistive or inductive), a blue backlight; and one or more user input devices 117, such as buttons, keys, toggles, joysticks, mouse pads and touch-screen contact points overlaying the LCD, as are known in the art. The portable digital audio playback device also preferably includes an identification chip 118 with a laser-burned encoded unique ID or serial number. The user input devices 117 of FIG. 1 preferably provide the functionality of: a "Power on/off" button 211; some functions may be provided by a 4-way disk button providing user-friendly functionality of conventional "Play," "Pause," "FF/REW," "Next," "Last," and "Stop" buttons 202; a "Toggle up/down" push button 203; a "Volume up/down" rocker switch; a "Wi-Fi on/off" position switch 204; an "Enter" button, and a "Back" button.

Additionally, software on the portable player device may automate certain functions that the user may control. A preferred embodiment of the present invention includes an automatic-off function that shuts off the player to conserve power if it is not in use for a specified period of time and preferably includes a WiFi on/off timer, waking the WiFi functionality of the portable player device to perform a Device-Network Synchronization (as referred to below) at pre-specified times (e.g., 3 am), as counted by the internal clock of the portable player device. If the device then detects an available WiFi network after a WiFi scan, it disables the WiFi functionality to conserve power if such a connection is not available or a Device-Network Synchronization is successfully completed.

The representative embodiment also has an antenna 205 capable of transmitting and receiving data over the WiFi network, a standard line-out jack 206 connected to a printed circuit board (PCB) 208 (on which the components of FIG. 1 are mounted, including a chipset consisting of at least: ARM processor (at least 200 Mhz with clock not settable or re-settable by user), digital-to-analog-to-digital converters, hard-disk drive controllers and/or flash memory drivers, SDRAM, LCD drivers and power-managed WiFi communications chipset) and a microphone input 207 connected to the PCB.

The data processing unit 112 may be incorporated within the computer controller 101. Additionally, the portable player device may include one or more of following: Modem/Direct Ethernet connecting circuit; digital-to-analog and analog-to-digital converters; and a USB or "FireWire" port.

A recharging cradle and docking unit connects to the portable player device and preferably includes: a power connector (such as for a 5 volt DC male connection), a data output connector (such as a USB male connector) that connects to the portable player device when the portable device is docked in the cradle; a power transformer; an AC power AC power cable; and an Ethernet line-in jack on the portable player device's cradle unit to enable direct connection to a modem.

It can be appreciated that various embodiments may be used to arrive at the foregoing portable digital audio playback device of the present invention without deviating from the spirit and intent of the invention. For example, an embodiment of the computer controller 101 may comprise an off-the-shelf PDA or dedicated portable digital audio player that already includes an integrated wireless communications capability, i.e., includes a communications module 108, rather than existing as a separate external module as presented above. An alternate embodiment may include the hard disk as part of the computer controller 101. Such embodiments should be considered as falling within the scope of the present invention.

The portable wireless communication player device 100 according to the present invention is constructed and arranged to operate as a standalone device that can search and obtain content over the Internet.

The data storage devices 103, 104 are used to search locally-stored fully searchable and browseable artist and song databases. The search may be based on indexed and periodically updated digital database files, enabling users to search for new content without being connected to the Internet. The device also enables obtaining the content merely by "clicking" on a selection, initiating a download, pseudo-download, or streaming process directly to the portable device the next time the device is connected to the network (wirelessly or otherwise). This avoids the need to first use a computer to obtain new content and then separately transfer it to a portable device. Finally, because it includes a relatively large screen (which may also be touch sensitive) and a powerful, but intuitive user interface, the software allows the users to easily re-order the sequence of content selections in their play lists, delete unwanted selections, and make other modifications to their content library without knowledge or training in the use a personal computer.

Users of portable digital audio devices often wish to listen to their music and other audio content through a separate output device other than headphones, such as a home/car stereo system or "boom box" portable stereo system. Since connecting the portable device to the preferred output device by means of a wire is also inconvenient for the user, according to the present invention, communications may be established using a wireless transmission protocol, such as WiFi (i.e., 802.11 standard or alternatively 802.16, 802.20, and the like). This is achieved by transmitting the audio output from the portable device in an analog (e.g., FM) or digital (e.g., over WiFi) form to a compatible receiver that is connected to, or built into the output device. Such a receiver, if WiFi-enabled, receives digital data over WiFi in encrypted or unencrypted form (compressed or uncompressed), process the received data (including by decoding and/or decrypting it) and outputting an analog audio signal that can be amplified and output through speakers for the user to hear. (An analog RF output can also be accordingly transmitted and received in a similar fashion using an RF output from the portable devices based on a WiFi communications chipset.) The hardware components that create the WiFi capability of the portable device for these purposes can be the same as those that allow such device, when within range of a WiFi access point connected to the Internet, to securely download and stream music and other audio from the Internet-based database server at broadband speeds, following which, the user can then play back the music in his or her chosen listening environment.

WiFi access hubs are typically provided across a geographic area—as businesses (e.g., coffee shops), the government (e.g., public parks), and residential users are opening up their WiFi networks for public availability. Public WiFi access hubs, commonly referred to as "hotspots," can be accessed by users in range of such hubs and constitute one available means by which a user of the presently invented portable player device can obtain audio and/or visual content from a network using a wireless access link. In addition to hotspots, users can obtain content in a similar fashion using a variety of other available means contemplated by the present invention, such as via an Internet-connected WiFi access hub located in the user's home, workplace, university, etc.

The media distribution system according to the present invention allows a user to wirelessly obtain digital content directly on a portable device on a subscription basis. This is achieved by (a) ensuring that the access device is incapable of playing subscription content (but not purchased or otherwise owned content) when the subscription is no longer valid, (b) limiting the usage rights associated with the delivered content through the digital rights management (DRM) software and (c) ensuring end-to-end security of content distribution.

Through the design of the network and the portable wireless communication player device, a digital rights management system can ensure that only valid subscribers can continue to access subscription content. This may be achieved by incorporating one or more of the following features: (1) including software on the portable wireless communication player device that will not play or decode the encryption of a content selection that is made available on a subscription basis (but not a purchased song) unless the device has received a verification, such as in the last 30 days, from the network that the device's subscription is valid and fully-paid; (2) including an internal clock on the device that is non-resettable by the user (which prevents users from avoiding the expiry and disablement of content based on the passage of time), and which synchronizes with a master clock each time the device connects with the network (a user resettable clock on the unit is merely displayed as an offset from the underlying non-resettable clock), in order to ensure that the time of song playback and current time can be properly recorded and reported to the network; (3) including a counter on the device that counts the number of times, including time and date, that each song was listened to or transferred or that a network authentication occurred, which reports this information back to the network, at which point a rules-based application in the secure network and/or on the portable device evaluates the recorded usage data reported by each device and indicates where inconsistencies or potential tampering may have occurred (e.g., potential tampering would be indicated by: that the clock must have been tampered with because two videos are indicating as having been played at the same time, or at a date prior to the time the device was purchased or prior to the last time-of-use last reported by the device; that it is impossible for x number of songs having a length of y to have been heard during the course of a one-day period; that the device incorrectly reports the times and dates of the last three network connections and/or the time elapsed since that time); (4) computer flagging of unusual activity coupled with human checking of these cases (e.g., a significantly higher than average number of viewings, listens, downloads or transfers per hour, day, week or month), (5) providing for the expiration of audio and video content, such as not permitting the playback of a song more than a predetermined number of times (e.g., 30) without a new authentication by the network and (6) requiring or encouraging subscribers to pay multiple months in advance (e.g., 6 months or 1 year) to diminish the incentive to subscribe for 1 month, download content, and then attempt to break the security measures.

Figure 5:
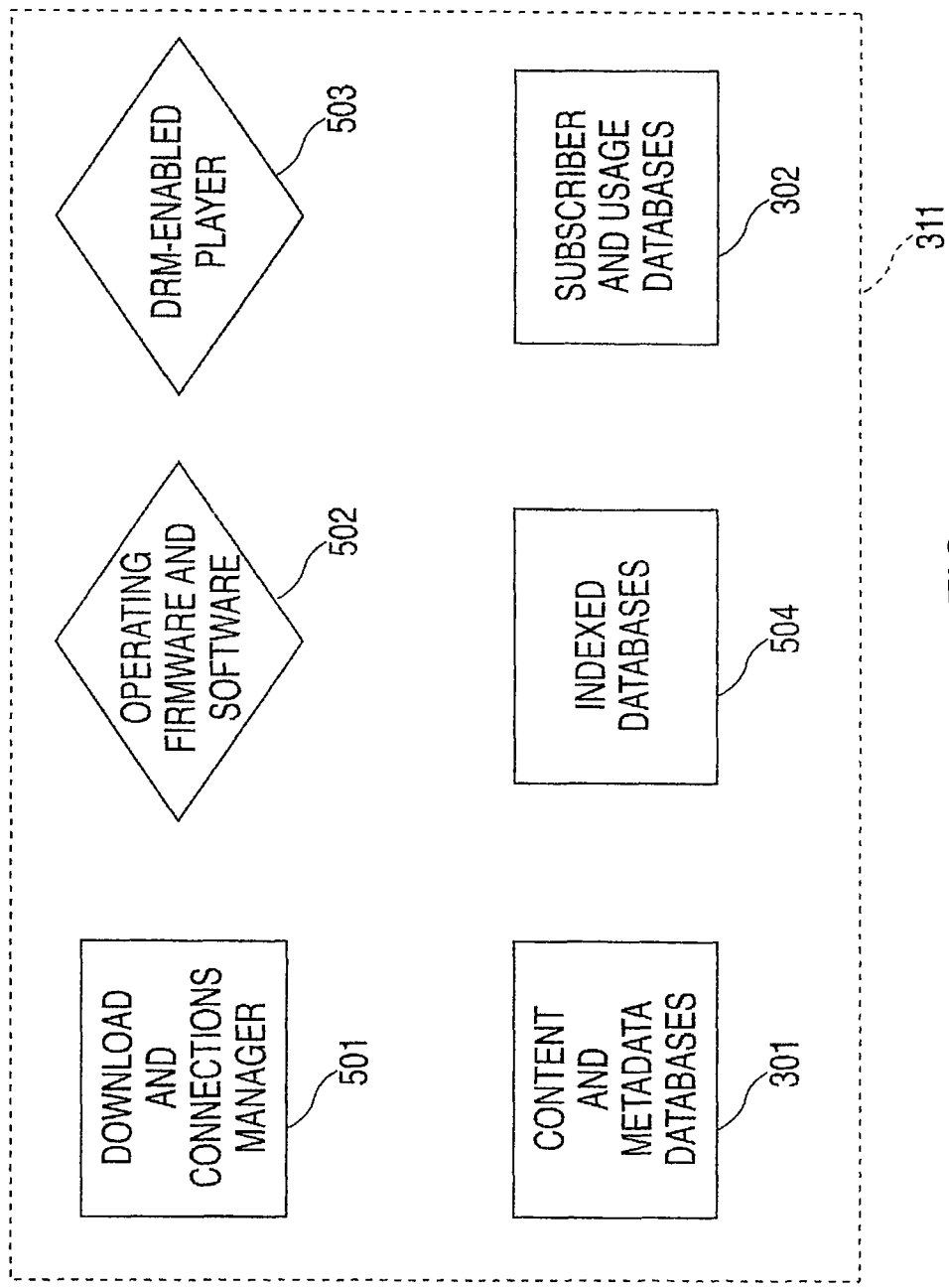
Figure 8:
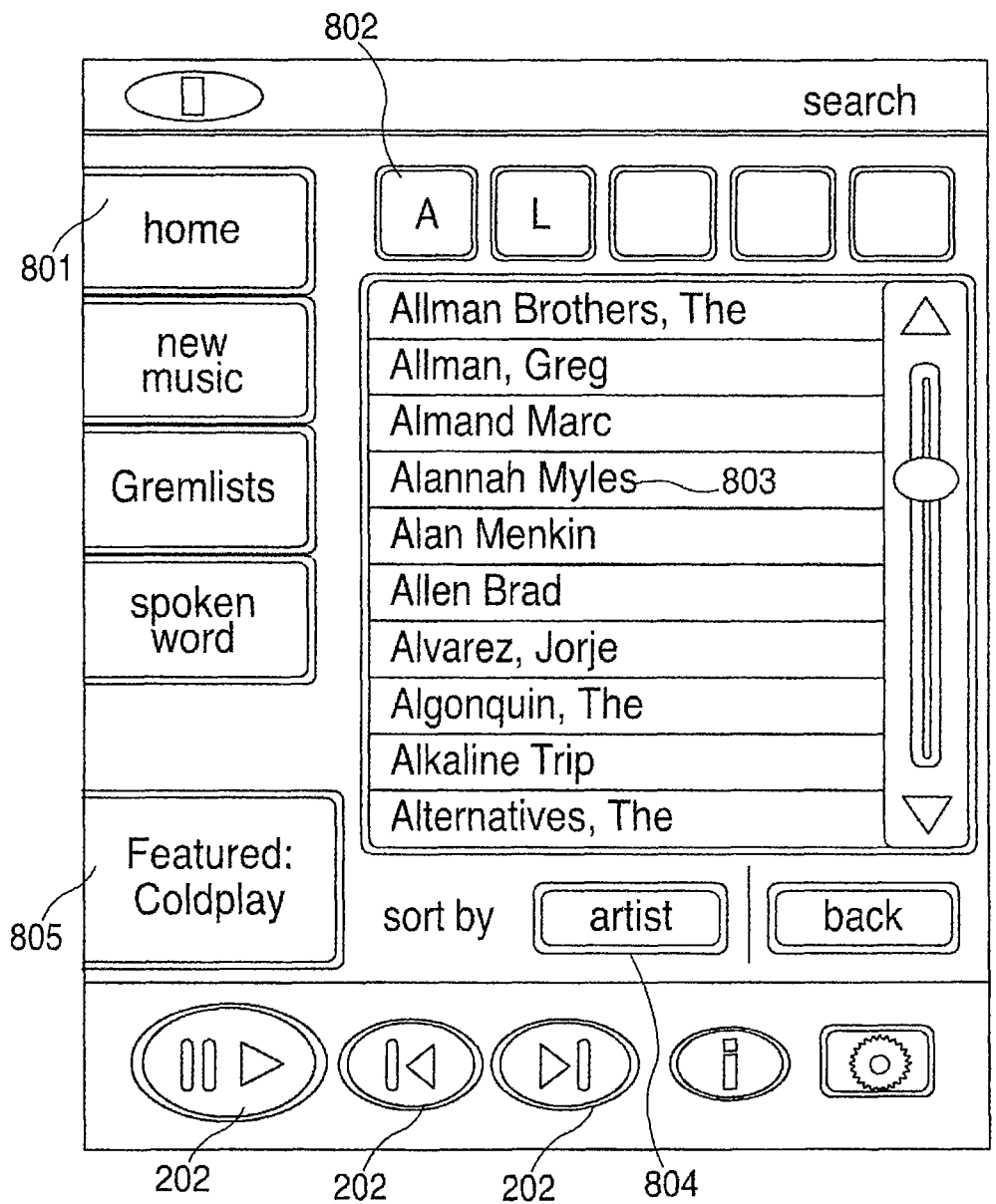

To become a subscriber, or purchase a la carte content, a user is prompted by the device to enter credit card information during a Device-Network Synchronization, FIG. 5 by selecting the digits of the credit card, the type of card and the expiration date through any of a variety of input mechanisms, such as the "spinning" character technique used in the preferred embodiment for search purposes (802, FIG. 8). The network performs a credit card authorization process and, if the user information is approved, subscribes the user and charges his or her credit card appropriately through a standard electronic credit card billing procedure. This process can be used for other payments the user is required to make, although the user's card information can be stored on the network in the subscriber database (302, FIG. 3) in order that the user would not need to re-enter this information but would only need to enter a 4-digit security PIN code that is similarly stored and verified by the network. Further, said "spinning" input technique described above operates by increasing or decreasing the character displayed in the space located above or below the text display box. The user toggles a switch up or down to modify the displayed character accordingly. On pushing the toggle button in, the character is entered and the user is able to similarly select the subsequent character in the string by advancing to the next space. The resulting character string in real time moves the pointer for the indexed database list to a corresponding position (and displays the corresponding portion of the list that matches the partial input string) so that the user can view and select the desired entry from the database listing.

The end-to-end system preferably has the following security components for content transfers: (A) a master content library that is stored in a secure database, (B) a content library that can only be accessed through a secure gateway that requires authentication as a valid portable wireless communication player device and current subscriber (a private key encryption may be used to avoid false identification as a valid account), (C) content that is delivered to the portable unit in encrypted form so that any interception of bits is useless unless the interceptor is otherwise capable of decoding the encryption, which is extremely difficult, (D) the portable wireless communication player device that contains a private key that is able to decode the encryption and play back the delivered audio and/or video files, and (E) device-to-device communications that consist of either (i) sending just a text playlist/titles of content selections, such that the second player device obtains only text named and/or ID data from the peer device and obtains the audio and/or video content securely from the network, or (ii) sending data content in encrypted form (e.g., wirelessly from one portable device to another) such that only the receiving device, which must be authenticated and have a valid subscription, can decode the encryption and make use of the content.

The audio and/or video data content may be distributed to the portable wireless communication player devices in encrypted form, capable of being played only when decrypted with a particular private digital decryption key. The internal clock of the portable wireless communication player device is preferably digitally set by establishing a secure and authenticated connection to the secure subscriber network that provides it with accurate time and date information not calibrated to time zones (i.e., preferably, only time for a single time zone in the world is used). The portable wireless communication player device preferably also includes a monitoring module that records the time and date each time a content selection is played or transferred by the device. The monitoring module also preferably includes a reporting module for transferring the monitoring results to the networks (i.e., the upload manager) when connection is made between the portable wireless communication player device and the network.

The present invention also allows users to share their content over the network. A user may connect to the network over WiFi and then browse or search the playlists, audio and/or video collections and favorite content of other users in a variety of ways, including by requesting from the network database a list of content sorted in descending order by popularity (e.g., number of users accessing selection, or total number of times listened/viewed), ranking (e.g., on published charts such as Billboard) or user rating; a list of audio and/or video selections sorted by geographic proximity of users (e.g., most popular videos/songs by number of views/listens for Birmingham, Ala., based on the billing addresses of the owners); a list of content selections a particular named user (who may be identified based on ratings or use of a particular playlist or other ways) currently stores on his or her portable device; or sorted in other ways. In each case, the network performs the necessary computation on request (or stores the results from such a computation) and provides it to the user by transmitting the appropriate listing of file IDs to the portable device. Each user is further given the opportunity to provide ratings for each piece of content and playlist they have, which may be shared with other users in a similar fashion, and may be used by the user as a way to personally track his or her favorite selections. Averages and statistics may also be compiled on the network in order to list content selections and playlists in order of their popularity according to user rating, number of listens/views or by other metrics. Users can also search the collections of other users based on the presence of particular content selections contained in the other user's playlists. Users may provide commentary and other information, which may be posted, and be viewable and/or searchable by other users that may be connected to the network. Users preferably will also be able to send messages, recommendations of playlists and pieces of content to other users by asking the network to send an e-mail to that person on the user's behalf.

Importantly, in this manner, a group of users that are either subscribers of a common service, are communicating over a common server, or are located in a common geographic location define a community sharing audio and/or video files. This sharing occurs either over the Internet, through a WiFi connection in an ad hoc mode, or other similar means.

Finally, according to the present invention, the portable wireless communication player device preferably includes an audio recorder and/or videocamera which enables users to record images and/or sounds into a digital file, playable on demand, as well as shareable. Users who create such a recording preferably have the ability to transmit such recording to other users via the wireless device-to-device method described above. This content file may not necessarily be encrypted. Further, the user will preferably be able to wirelessly transmit the recorded digital file to the network that will then further transmit the file, as requested, to other users or to an e-mail or IM address. This will permit "media e-mails/IMs" to occur between users or between the user and virtually anyone with an e-mail or IM account.

In an exemplary application of the embodiments of the current invention, when not within range of a WiFi connection point, the large storage media (209, FIG. 2) included in the portable wireless communication player device (FIG. 2) allows pre-downloaded audio and/or video files and/or metadata to be searched "off-line". Using this stored "local database" (504, FIG. 5) and by optimizing sporadic WiFi connections, which allow the network (315, FIG. 3) to update the local database (504, FIG. 5) on the portable device as necessary during each Device-Network Synchronization (as defined in FIGS. 4 and 5), allows the user to search in any number of ways, including by most popular selections, genre, or alphabetically. Navigation of this local database may use an up/down toggle button 203 on the device to "spin" letters up and down (802, FIG. 8), one at a time, to create a five- or six-character string, while the list of artists or titles displayed changes to match the partial string created (803, FIG. 8), enabling a user to zero-in quickly on a particular artist or title by searching alphabetically. Alternatively, a user could search by other methods, such as by popularity (number of plays or downloads by users, published rankings, aggregated and averaged user ratings, volume of purchases or other ways) (804, FIG. 8).

Once a media file, playlist or other file is identified and selected for download (901, FIG. 9), the selection is added to a "stack" of tasks that are to occur at a next Internet connection (502, FIG. 5) during a Device-Network Synchronization operation. If in its cradle (406, FIG. 4), which connects directly to the Internet via any of a number of standard connections (e.g., CAT-5 or -6/Ethernet cable) to an Internet hub (e.g., cable modem) (404, FIG. 4), the portable unit automatically detects and establishes a connection to the network. Placement in the cradle (406, FIG. 4) triggers the device to send a secure authentication message through the Internet to the network. When not in its cradle and the "stack" is not empty, the device periodically scans and searches for a WiFi network connection (e.g., once every 3 minutes) until one is identified and established. If multiple networks are available, the device automatically selects one based on predetermined criteria. For example, the device may select the network with the strongest signal, unless the user is not permitted to access that network in which case the device will automatically select the next strongest available connection.

Figure 4:
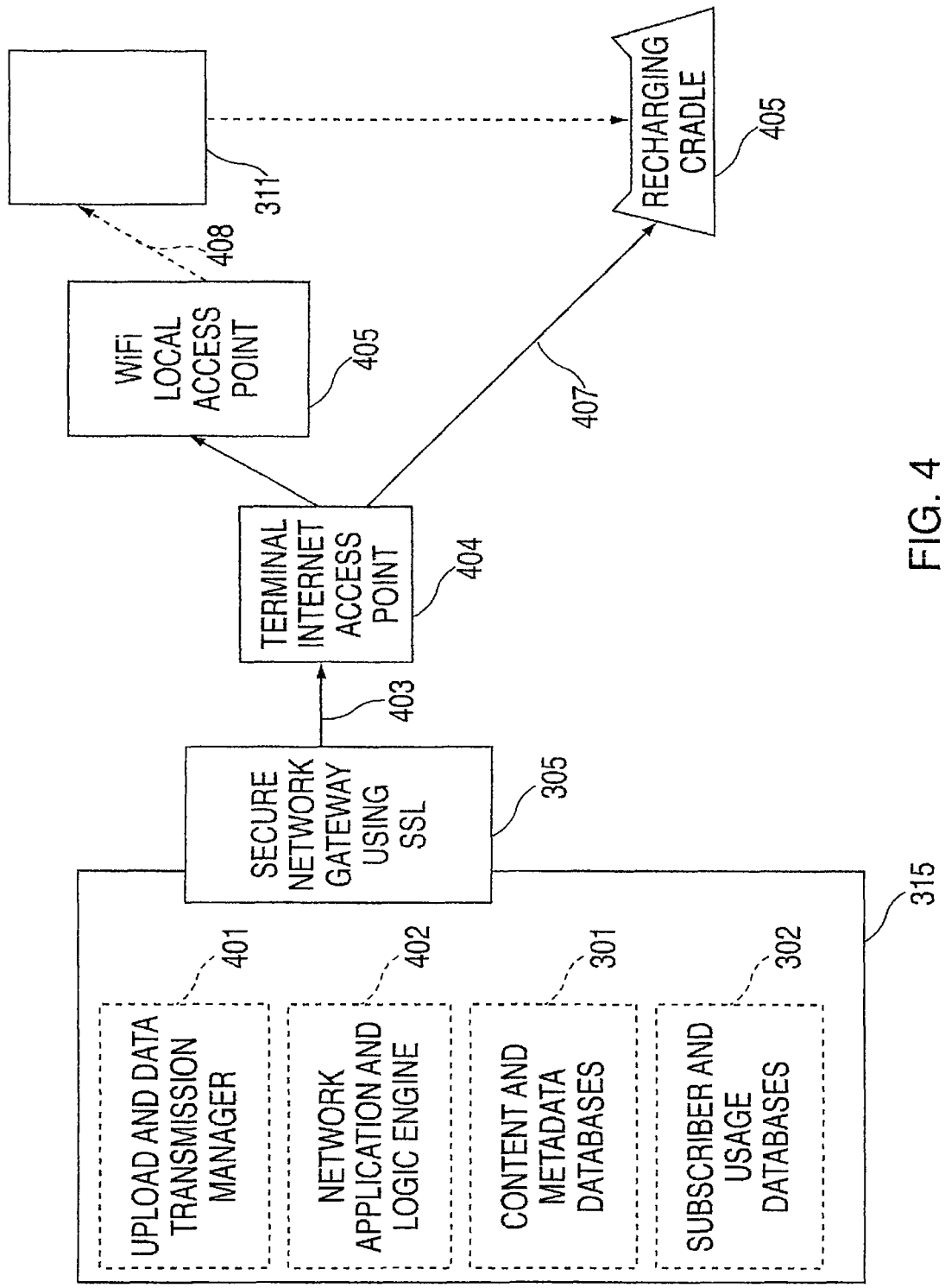
FIGS. 4 and 5 show a Device-Network Synchronization pathway and associated software modules.

FIGS. 4 and 5 show the data flow and the software modules participating or implementing a typical device-network synchronization procedure. Upon a cradle-based or WiFi-based connection being established, the device 311 sends a secure authentication message to the network 315 using private/public key encryption. The network 315 authenticates the message. At that point the portable device 311 provides usage information to the network 315, including the date, time, and number of times (with time and date) each content selection has been played by the user (for example, by counting selections played for more than 20 seconds as one "play," or other similar criteria) or transfers to or from the device to any peer device that have occurred and any changes in the content stored on the device, such as deletions and additions of new content selections.

The network 315 then performs a number of anti-fraud checks, such as ensuring it does not simultaneously have a connection to the same device ID open (one of which must be fraudulent), that the number of plays is not inconsistent with the time elapsed, that the times and dates reported for plays are not internally inconsistent, etc. Once these processes have been completed, the portable device 311 initiates requests from its "stack." If a selection was only partially downloaded in a previous session, a download manager 501 using a conventional download mechanism initiates the download from the network 311 at the point the download last left off by communicating a "pointer" to the network 311. Additional new selections the user made are then downloaded automatically in a predetermined order. As part of this process, the network preferably assigns a unique identification to each subscriber device.

The display screen of the device 311 may indicate to the user that download activity is occurring, as well as display the name of the selection being downloaded or information on any other current activity. This procedure may also be implemented if the user does not come within range of a WiFi Internet connection but instead comes into range of another portable device that has the desired content stored on it. The device 311 identifies if a target content selection is on the other device and obtains the selection from the second device using the device-to-device protocol.

The system of the present invention enables the following secure functions:

1) Valid subscribers are able to select a song or video and choose to "beam" it to another player device over a WiFi connection or other similar connections. This is preferably done by selecting the item to be beamed (see FIG. 6), at which point the user sees a list of other valid devices in range (this list may be created by doing a WiFi scan for portable wireless communication subscriber player device (or player devices) in device-to-device/ad hoc mode). These other devices are displayed by the name given to the target player device by its user; other information may include profile information on the user, such as a photo, first name, favorite music genre, etc. The user selects the target player device it wants to transfer or send the file to, and the sender's player device then transmits the digital file to the receiver via a WiFi connection. This is accomplished by equipping each player device with server software (e.g., such as HTTP: server software, such as that available from Microsoft for PocketPC devices). To initiate a transfer, the sending player device sends a message to the receiving player device, indicating that it should make a request to it for the specified item. The receiving device then "pulls" the file to it over the WiFi connection, FIGS. 6 and 7; this process can also be architected as a "push." If a subscription of a potential receiving player device is expired, the receiver may be able to obtain a copy of the file, but the digital rights management software local on the receiver's player device will not permit the user to play the content. If the user's subscription later becomes valid, the user will be able to access the file without re-downloading it.

2) Valid subscribers can "beam" playlists to other users in a similar fashion to the above method—instead of transmitting a digital audio or video file, however, a playlist file, which may merely be text, is transmitted. The receiving player device then alerts the user as to content indicated on the playlist that is not stored on his player device. If the user desires, the player device adds the missing selections to the "stack." It then can obtain the content file directly from the sending player device, or else upon the next network connection over the Internet (see FIGS. 4, 5, 6 and 7).

3) Valid subscribers can scan and pull content files from users that are in WiFi range. The player device will compile a list of all potential device-to-device WiFi connections in the area based on a "scan" (a process known, developed, and available on WiFi-enabled Toshiba e740 or e755 Pocket PC devices) and will display this list to the user. If the user selects one of the player devices, the player device will display a listing of all the content and playlists on the second player device, allowing the user to browse and search the collection. If the user identifies a desired playlist or content file, it can then "pull" the selection from the second player device onto its player device in the way indicated above—i.e., the sending player device will in effect become a server and the receiving player device will "pull" the file from the server device over WiFi (see FIGS. 6 and 7). The prior art does not include an automated and user-friendly method by which a WiFi (or similar connection) "scan" can be conducted, invisible to the user, and a connection established; it also does not permit the automated switching between "infrastructure" and "ad hoc" modes based on the desired user function. The present invention overcomes this difficulty by including software on the portable apparatus that triggers the appropriate mode (based on desired user function), periodic scans, sorting of available WiFi (or other wireless) devices and a connection to the strongest available device.

4) Alternatively, for greater security, in place of each file transfer described above, the player devices may transmit only the name of the desired file, which will automatically be added to the "stack" and then be obtained by the receiving player device at the next network connection over the Internet.

5) Users preferably have the option to turn privacy on or off in order to disable other users from seeing their audio and/or video files and from obtaining copies from the player device. In the "off" mode a player device receiving a request for playlist, media file information or digital media files, will reject the request, sending a rejection message to the initiating player device.

6) Users will also have the option to turn the WiFi broadcast feature on or off to prevent the WiFi transmitter/receiver from draining battery life on the player device via an easily accessible and clearly marked external button on the player device itself (or, alternatively, via a software switch and graphical user interface.) If the WiFi access is not used for a specified period of time (e.g., 5 minutes) the WiFi transmitter/receiver preferably automatically turns off from active mode to conserve power. When items are queued in the stack, the WiFi will preferably periodically turn on to scan for WiFi connectivity and then turn off again in order to conserve power.

Additionally, by scanning the entire set of player devices in range, a user's player device enables a search-and-browse mode that includes an aggregation of all media files available in the area. The user's player device completes a scan, aggregates and alphabetizes (or otherwise organizes, such as by genre or popularity) the selections available, and then allows the user to search or browse all audio and/or video files in the area at one time. If the user desires to obtain a particular audio or video selection, the player device then indicates which user or users are able to provide the media file.

Further, because users can record audio and/or video on the player device, creating a compressed digital media file, users can, in effect, send "media e-mails", "media IMs" and other recordings to one another through a direct device-to-device or indirect device-to-network-to-device connection. For security purposes, these recordings can, in a preferred embodiment, be limited in length (e.g., to one minute) by use of a software timer, making piracy and distribution of copyrighted music and video difficult and inconvenient for the user in order to protect content owner rights.

Figure 6:
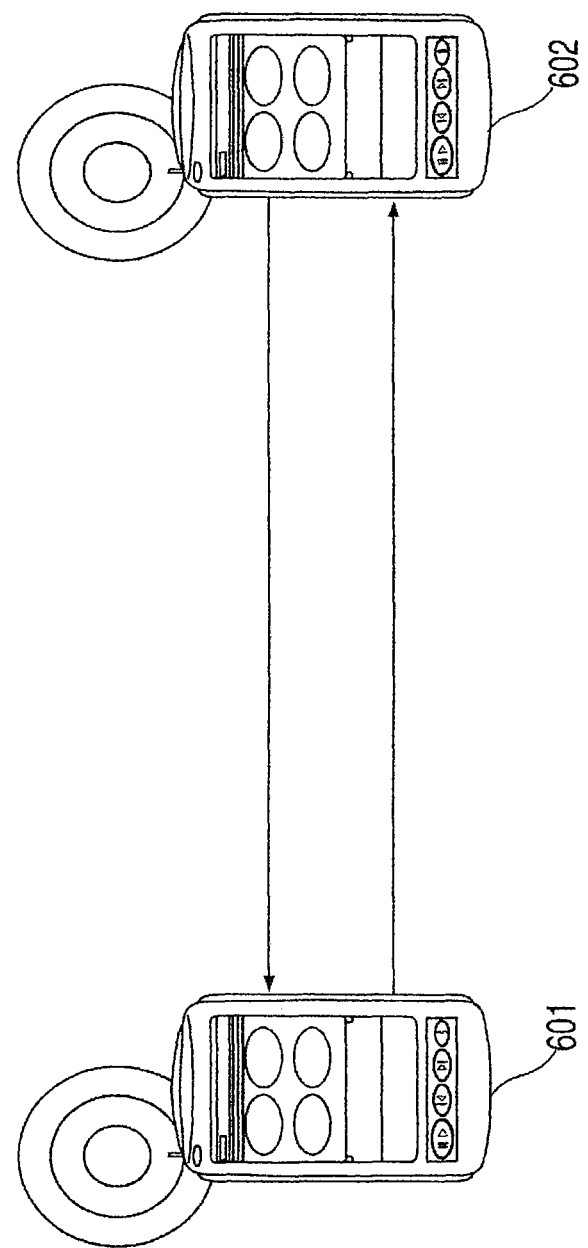
FIG. 6 shows a peer-to-peer communication system according to one embodiment.
Figure 7:
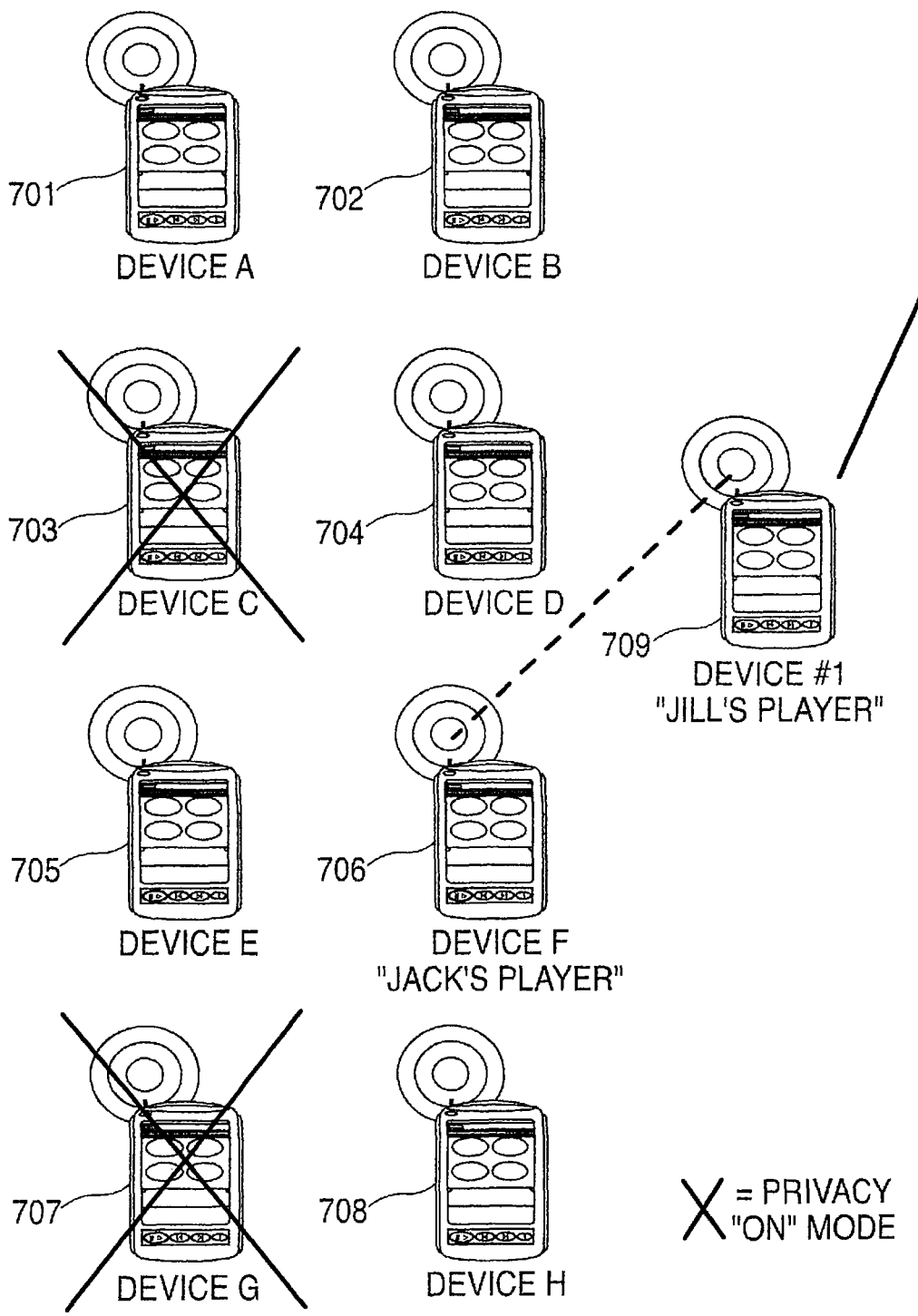
FIG. 7 shows peer-to-peer functionality of the elements shown in FIG. 6, including that involving multiple peer devices simultaneously in range.

FIGS. 6 and 7 show how the system provides a way for player devices to connect peer-to-peer (also known as "P2P") to share content without having to access the Internet. There are currently no non-PC-based file sharing networks that are easy to use and available for non-technical users—all P2P software is currently written for PCs and requires a continuous Internet connection during use. The present invention does not require Internet connections, but instead connect to each other directly using WiFi, forming a temporary virtual private network. Each player device that seeks to become part of such temporary network would perform a standard scan using WiFi (or another wireless technology now existing or hereafter created) to identify all non-private compatible player devices. It would then compile a listing of the content on such player devices and permit each user to search or browse the content in this temporary network, either by searching the content located on a particular user's player device or by searching all the content on any available player device on a single integrated list.

Description of Certain Figures

FIG. 2 depicts a preferred embodiment of the portable player device 100 described herein, including: protective housing 212, a WiFi antenna insulated as much as possible from potentially interfering circuits and materials 205, a standard line-out jack into which headphones or a line-out cable can be plugged 206, a microphone input used to record the user's voice or other audio when sending "media e-mails" and the like (described above) or other content 207, an LCD touch-screen 201, which may be in color, preferably two inches in width, and capable of displaying at least 10 lines of text at one time, and a chipset 208 consisting of at least one microprocessor, such as a 200 MHz ARM processor, with clock preferably not settable or re-settable by user. The microprocessor is used for performing various functions, such as encoding and decoding DRM-protected audio and/or video content in real time, encryption and decryption, and so on. The chip set 208 may also include digital-to-analog and analog-to-digital converters, hard disk drive controllers and/or flash memory drivers, SDRAM, LCD drivers and a power-managed WiFi communications circuitry. The chip set may further include a digital unique ID or serial number (e.g., laser-burned or otherwise) attaching in such way that a user would have great difficulty modifying it 118. The device also includes PCB 204, non-erasable digital memory in the form of a mini-hard disk 209 or flash (e.g., SD or compact flash) consisting of at least 0.25 gigabyte storage capacity. Power is provided by rechargeable lithium-ion or lithium polymer battery or other power source 210. An up/down/push toggle switch is provided as an external input device and connected to the PCB 204. The device 100 may include standard play control buttons 202 and a power on/off button 211. Optionally, the device may also include other buttons, switches, keys or other input devices suitable for control of the user interface, including a WiFi on/off switch, an "info" button that toggles display of information on the current selection being played on the device and a "beam" button that initiates the sending of a content selection by the user to another user (optional buttons not depicted for the sake of clarity).

Figure 3:
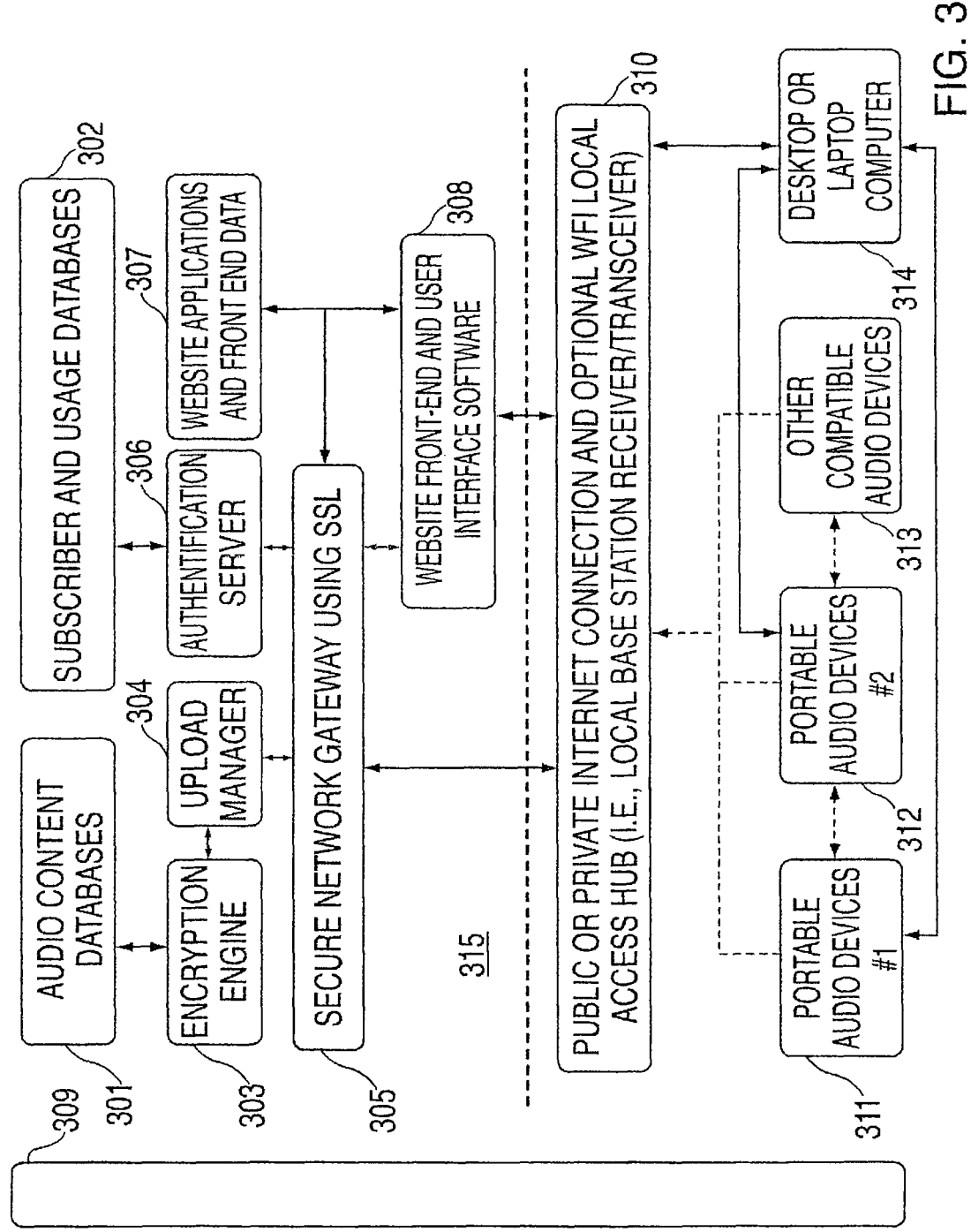
FIG. 3 shows a diagram of a content distribution network according to one embodiment.

FIG. 3 depicts the content distribution network and associated compatible access devices. The network 315 includes one or more content databases 301 that securely store digital content and associated metadata (such as file length, title, encoding rate, release date, and other related information), subscriber and usage databases 302 that securely store data regarding each user's activities (such as, downloaded titles), content transfers to peer devices, previous Device-Network Synchronizations and other information, an encryption engine 303 that optionally encrypts content before it is delivered outside the network using standard public-private key encryption method, an upload manager 304 that manages the error-checked delivery of content to permitted user devices and that can initiate a download from a given "pointer" in the event only a portion of a download file was previously transmitted, an authentication server 306 that authenticates the unique ID or serial number provided by each user's device and ensures (based on subscriber data stored in the subscriber and usage databases) that the user's device is associated with a valid and current subscription, and a secure network gateway 305 that manages multiple simultaneous connections to users over secure sockets layer. Additionally, security and digital rights management software 309 is installed throughout relevant applications in the network and on user devices, and is optionally "wrapped" around all digital content delivered from the network, in order to ensure that digital rights of content owners can be protected from end-to-end. Users are permitted to use a computer if they wish (but are not required to do so at any time for any purpose), in which case they can use a standard desktop or laptop computer 314 equipped with standard Internet browser software connected to the Internet 310 wirelessly or through wired means to access the network's Web site 308, the pages of which are generated dynamically based on Web site software and related applications 307. Content need not ever be delivered to the computer 314, and the Web site front-end and user interface software 308 can merely enable the user to search, sort, organize, order content to be delivered to his or her portable device 311, 312, or for other account-related functions. Preferably, a user will use a portable device or other compatible device 311, 312 to access and manage content over a WiFi connection or a wired connection via cradle 405, FIG. 4. as discussed below. Of course, the various elements described above may be combined and are depicted as individual elements only for the sake of clarity.

FIGS. 4 and 5 depict a Device-Network Synchronization pathway and associated software modules for establishing communication between a device, such as device 311 in FIG. 3 and a network 315. The device establishes connection with network, either by detecting and connecting to a local WiFi base station (which is in turn connected to the Internet) or by being placed in a wired cradle connected to the Internet (e.g., over a CAT-5 or -6 cable connected to a cable modem); either event will trigger the procedure described below. The device 311 establishes a secure-sockets layer (SSL) connection with the network. As part of this process, the device 311 provides its unique ID or serial number, from laser-burned chip 118, in encrypted form to network 315. The network authenticates transmitted ID and ensures same ID is not currently open (i.e., to prevent possibility of multiple fraudulent log-ons). The network queries device to obtain usage and security data. The device provides requested usage data 302 and security to network, including: current date and time, date and time of last three established network connections and IDs of each content selection played since last network data transmission and times and dates of each play. The network queries its subscriber data database to obtain subscriber status (i.e., valid or invalid and permitted access level). The network obtains data regarding previous network connections and downloads from subscriber database and applies security check rules to subscriber data (e.g., current time and date are correct, number of plays is consistent with reported time and date data), and also received data on the device ID, content, time and date of any device-to-device content transfers. If the network determines device ID is invalid or potentially fraudulent or that security data indicates likelihood of fraud, network sends disabling message to digital rights management software (DRM) on device, disabling use of any subscription content and displaying an access denied message to user. If network determines usage and security data are internally consistent and consistent with its subscriber database data, it queries the device for its stack. The device receives the query and checks its stack; if the stack is not empty, it provided requests from the stack to the network (i.e., all requested content downloads, playlist downloads, credit card and payment information uploads, contents storage changes upload, audio message and content uploads) and the network responds by providing appropriate content and/or data subject to DRM and over SSL, using an upload manager that ensures data integrity in the transmission and which can continue a partial download that was not previously completed. The network checks to see if updates are required to the software on the device, including updates to the database of available content locally stored on the device, and if so, the network provides auto-executable files to the device which will update the software and/or other data. The network preferably performs a consistency check with the content present on the device and then terminates the connection.

The network 315 includes a network application and logic engine 402 that manages communications with the portable device 311, authentication and logic at the network (such as application of security rules) and communications via the upload and data transmission manager 401/304. A local base station receiver 405 (i.e., wireless Internet access point) 404 connects to a wired Internet access point 405. The base station receiver connects over WiFi protocols to the portable device 311, triggering the Device-Network Synchronization procedure. Alternatively, placement in a wired docking cradle 406 triggers this process.

As shown in FIG. 5 the software and data on the portable device 311 minimally includes segregated secure (including DRM "wrappers") and non-secure content and metadata databases 301, indexed databases 504 including available artists and titles, which are updated as necessary during each Device-Network Synchronization procedure, subscriber and usage databases 302 that track and store the times and dates of each play of a content file, transfers of content to and from other peer devices, Device-Network Synchronizations procedure, and other data, a download and connections manager 501, operating firmware and software 502, including the "stack," which records the tasks the portable device wishes to accomplish during the next Device-Network Synchronization, and DRM-enabled player and access software 503, including one or more codecs (such as for MP3) and optionally decryption/encryption software.

FIG. 6 depicts a peer-to-peer communication. In this Figure, communication is established between two portable devices 601 and 602 for the purpose of exchanging content. Preferably, devices 601 and 602 are portable WiFi-enabled devices described in the present invention, each with privacy mode "off." Device 601 and device 602 each perform a WiFi "scan," similar to that performed by a WiFi-enabled Toshiba e755 PDA in "ad hoc" mode, and this scan produces a listing of available WiFi devices in range, such as device 602. Other devices, even when no Internet connection is present, are available as well. The user of 601 inputs a request to see what content selection device 602 is currently playing and, accordingly, 601 transmits a request over WiFi to 602. Device 602 acknowledges the request to device 601 and invokes an HTTP: server software module that enables 601 to see the currently playing selection on 602 by using a browser technique and to see, on request, any other content that is currently stored, even if not playing, on device 602. The user of 601 selects one or more content files stored on 602. Alternately, this process is triggered if the "stack" of 601 (see FIGS. 9 and 10) includes an instruction to obtain a particular content selection that is available on 602. In either case, 601 sends a request to 602 to obtain the selected content and 601 "pulls" the content from 602 by downloading it, using 602's server software. The user of 601 can begin playing the selection downloaded from 602, provided the DRM software on 601 permits this to occur, at which point 601 will continue to store the content received from device 602. At its next connection with the network, 601 will report the receipt of content, including time and date, to the network, which data will be stored in the network subscriber data database.

FIG. 7 depicts peer-to-peer functionality, including that involving multiple peer devices that are simultaneously within range of each other.

Device 709 ("Jill's player") detects the presence of other devices in range by performing a periodic scan using WiFi (or another acceptable wireless technology). The device then performs the following functions. Device 709 identifies whether devices are in privacy "on" mode. Where privacy is "off," 703, 707, device 709 identifies the name given to each device, (e.g., "Jack's player" 706). Device 709 displays a list of available devices to the user by listing the names of each player, and the current content selection being played at that time on the player (e.g., 706, Beethoven's $5^{th}$ Symphony). Device 709 enables the user to select one or more other user devices (701-708) and browse files and playlists available on those devices, e.g., 706 would show 50 available selections and 2 playlists. Device 709 also compiles a list of all media files and playlists available on all other available devices in one list and enables the user to search and browse the list. If the user selects a file on device 709, the device will know which of devices 701-708 have the file available and will seek it out. Here, the files available on devices 701-708, except devices 703 and 707, would be displayed (because the latter have privacy "on"). When the user of device 709 selects a particular file or playlist (e.g., from Jack's Player 706), the file is then delivered over a wireless connection to device 709.

Alternately, 709 may obtain only the name and unique ID of the selected file or playlist from 706 and may obtain the file itself later from the distribution network once a connection is available. Once the file is obtained, 709 will only allow the user to access it if the digital rights management software on 709 permits it to do so.

Additionally, device-to-device and device-to-network-to-device functions include the following functions. A user of 709 can choose to "beam" a file to another user by selecting the file and selecting "beam." At that point 709 displays a list of available non-private devices (701-708 except 703 and 707). The user of 709 selects the target device, 706 and initiates transmission. Device 706 then indicates, "Jill's player, 709, is sending you [name of file or musical or non-musical audio selection]. Accept?" User of 706 can then either select "yes" and accept transmission or "no" and reject transmission. If "yes" is selected, the file is transmitted over a wireless connection from 709. Alternatively, 709 will merely transmit the metadata information for the file and 706 will add the information to its stack for acquisition from the network during the next connection with the network over the Internet.

The user of 709 can record audio content using a built-in microphone and recorder, or create another sort of file, and beam it to another user in a similar way described above. In this way, users may send "audio e-mails" to one another. They may also make available audio thoughts for others to browse and download to their player.

Users can develop "public" digital profiles including their photo, first name, favorite music and hobbies, etc. and enable other users in range to browse and search this information at will.

Alternatively, any of the device-to-device functions described in this application can be transferred device-to-network-to-device to permit users who are not in wireless range or are not present at the same time to share data and files in much the same way.

Simple matching software can be added as well to enable devices to automatically scan profiles of other users and indicate if there is a match in interests between users.

Additionally, this system can be used to create ad hoc peer-to-peer networks for file and data sharing in particular geographic locations, where users are in range of one another.

Users can extend this capability by posting data and listings on a network for other users to browse and search at other times and from other locations.

FIG. 8 depicts a preferred embodiment of an easy and convenient search method for non-technical users. Simple menu tab 801 is used to indicate, and allow choice via a touch-screen, the current and available areas of search. One-to-one marketing and communications 805, triggered by the particular selection or activity of the user at a particular time, displays an appropriate message that is stored on the portable device following a Device-Network Synchronization and is generated based on application software on the device. Intuitive play controls 202 for non-technical users enable easy play and control of located and accessed content. Users can search for new content at any time, without being connected to the Internet or any external database, by searching the locally stored database on the device via a "spinning letter" technique 802 or other acceptable input mechanism. When letters are spun, the character string generated scrolls the listing of available content displayed in text box 803 in real time. This enables even a non-technical user to zero in and locate a particular item very quickly for on-demand deliver. Users can search content listings sorted in a variety of orders by toggling a sort button 804, which can be done alphabetically by artist or title, or by popularity, ranking or genre.

Figure 9:
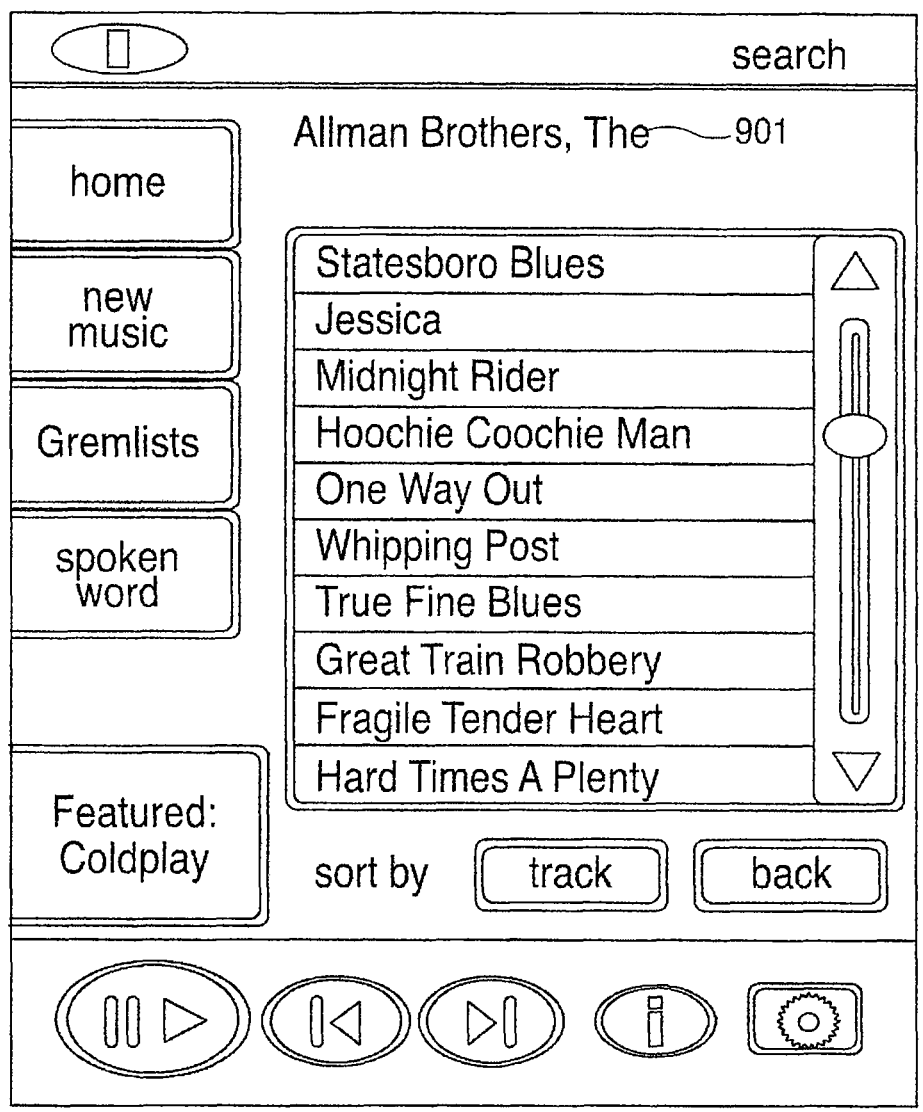
FIG. 9 shows a representative first user interface screen according to one embodiment.
Figure 10:
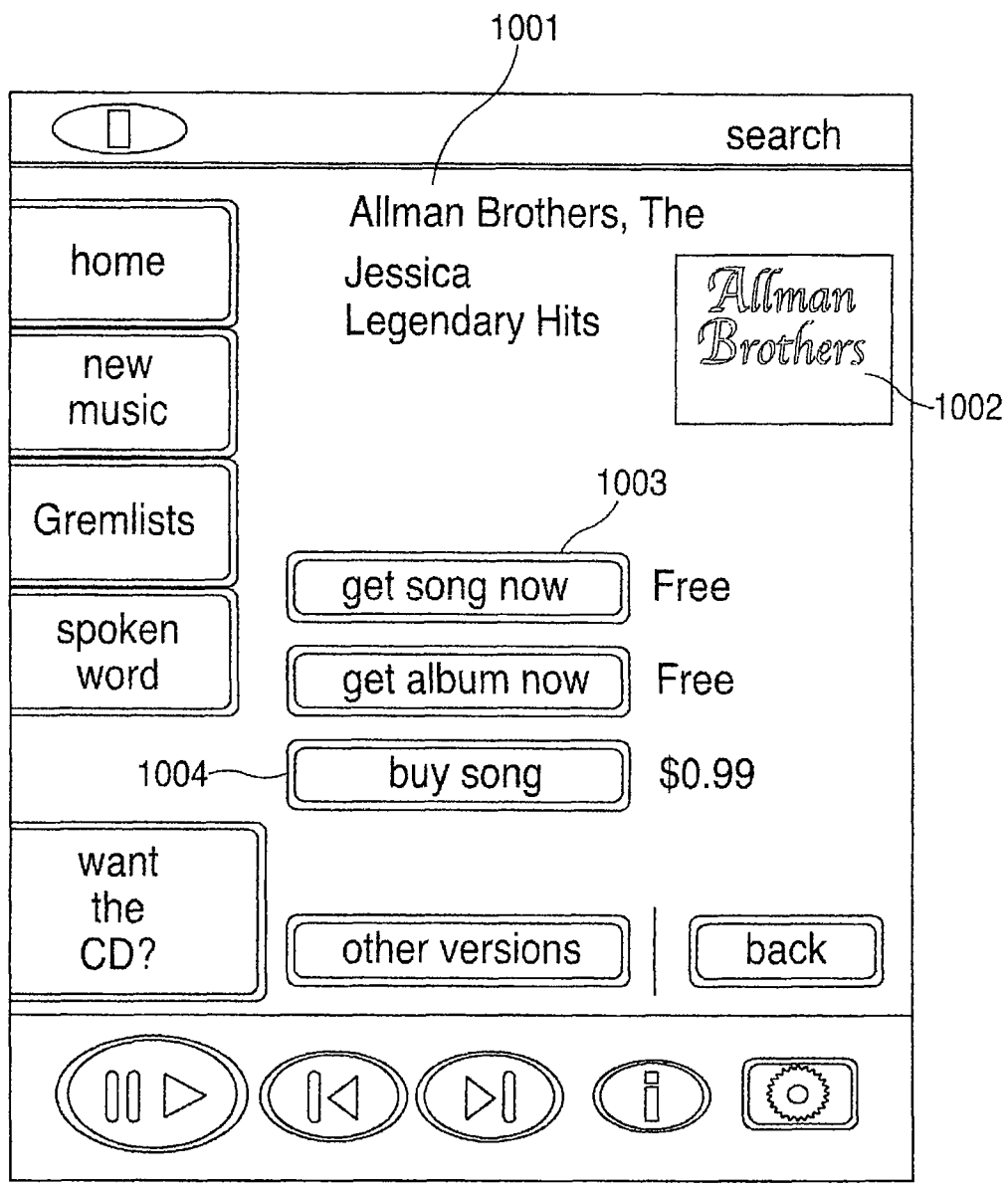

FIGS. 9 and 10 depict easy wireless access to content for a non-technical user. After identifying a selection as described in the above paragraph, users can use the touch-screen to select an artist, after which, they are presented with a listing of tracks by that artist, which may be scrolled through or searched in another easy way. These tracks are displayed in text box 901. After the user selects an item (by using the touch-screen or pushing in the toggle button when the desired item is highlighted) the album, artist and title information are displayed FIG. 10 1001 along with a graphic that represents the album cover art 1002 (which may be enlarged by touching it). By selecting "get song now" or "get album now" 1003, subscribers can access the selection on demand. If they are not in range of an Internet connection, this operation will be added to the "stack" 502 and initiated during the next Device-Network Synchronization. Alternatively, the user may purchase a track for a displayed price 1004, whether or not a current subscriber, following which the DRM will allow the user to transfer the file to other devices, subject to specified restrictions, and to retain the file indefinitely even if his or her subscription is no longer valid. These song purchases permit permanent ownership of the track and the ability to transfer it to other devices. Billing follows the above-described procedure and requires input at the minimum of a PIN code by the user to authorize charges on his or her credit card.

Figure 11:
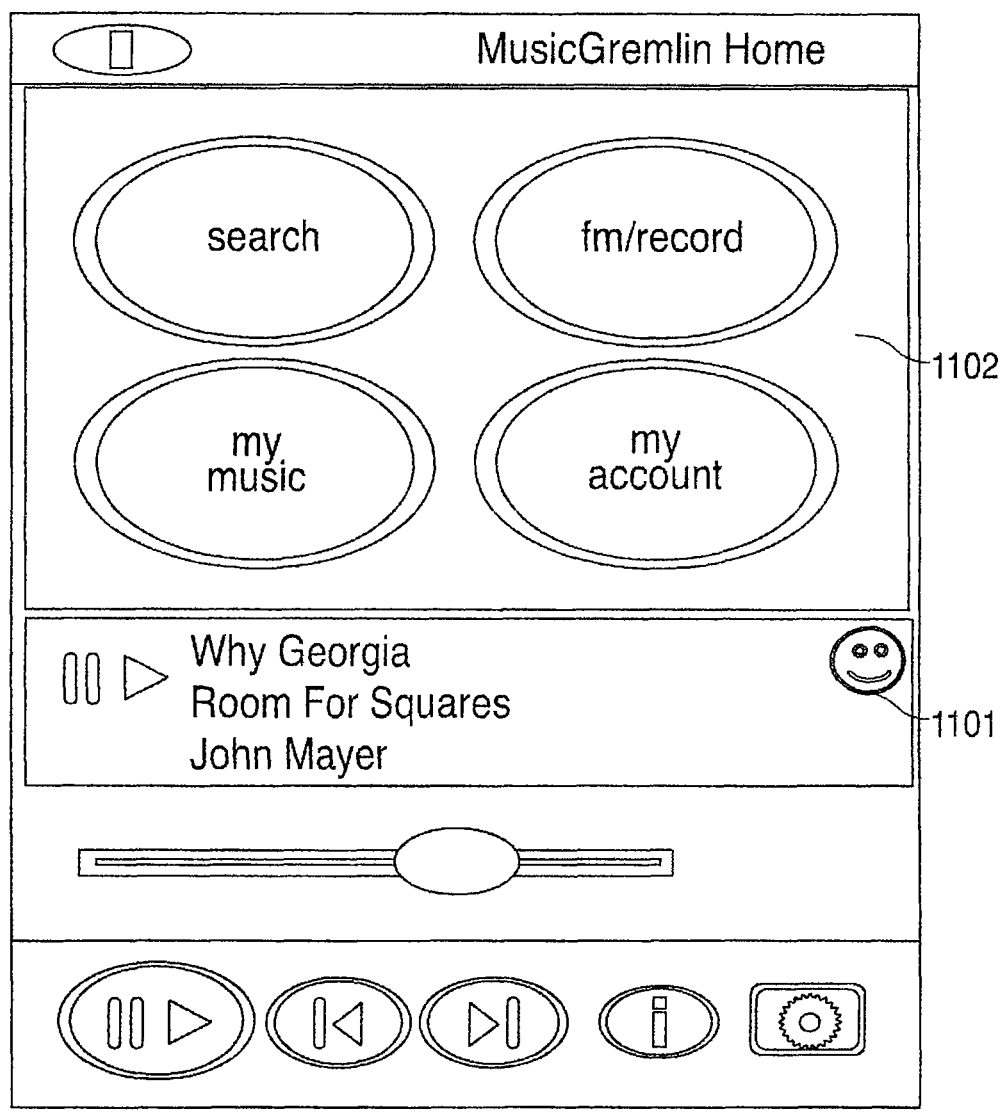
FIGS. 11-17 show a plurality of music management operations that may be performed by a non-technical user without the use of a computer or intervening device.
Figure 12:
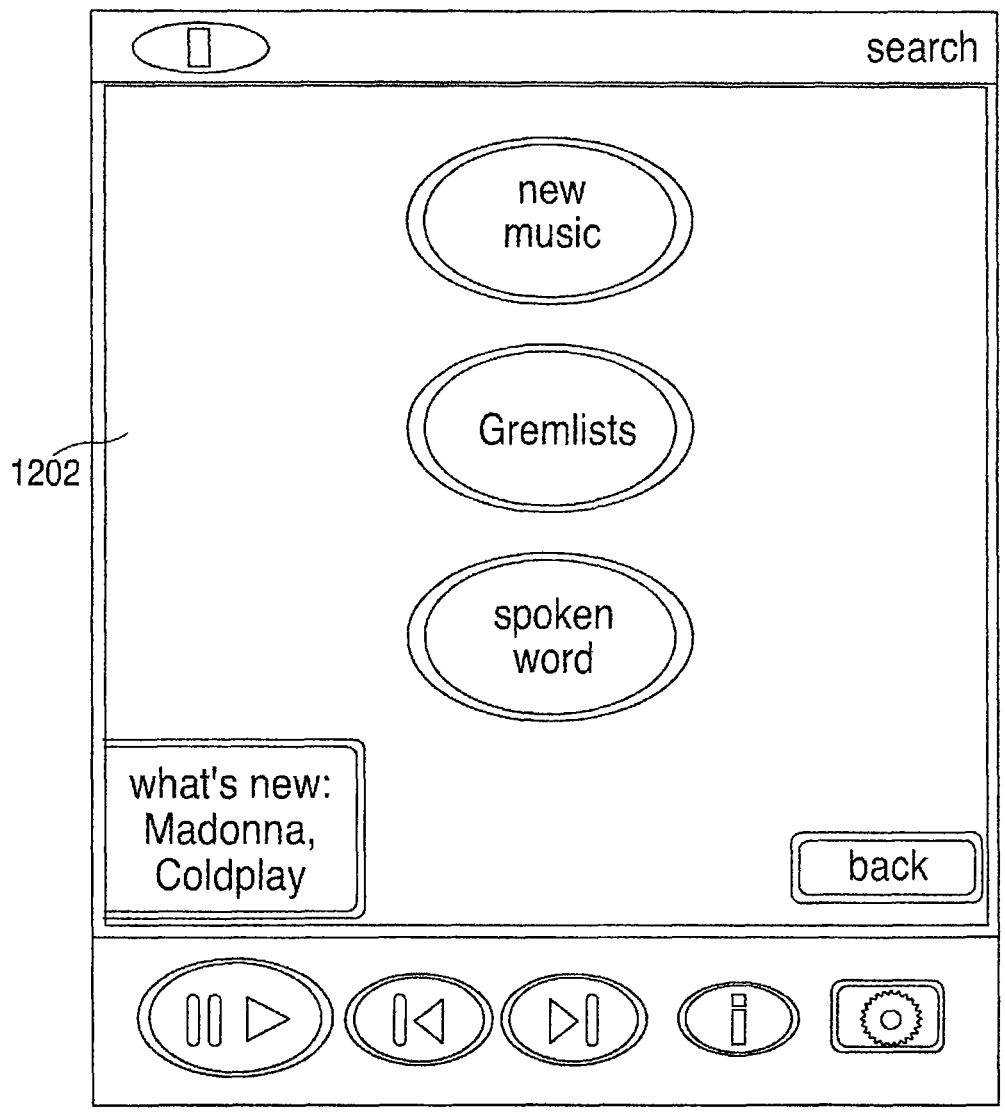
Figure 13:
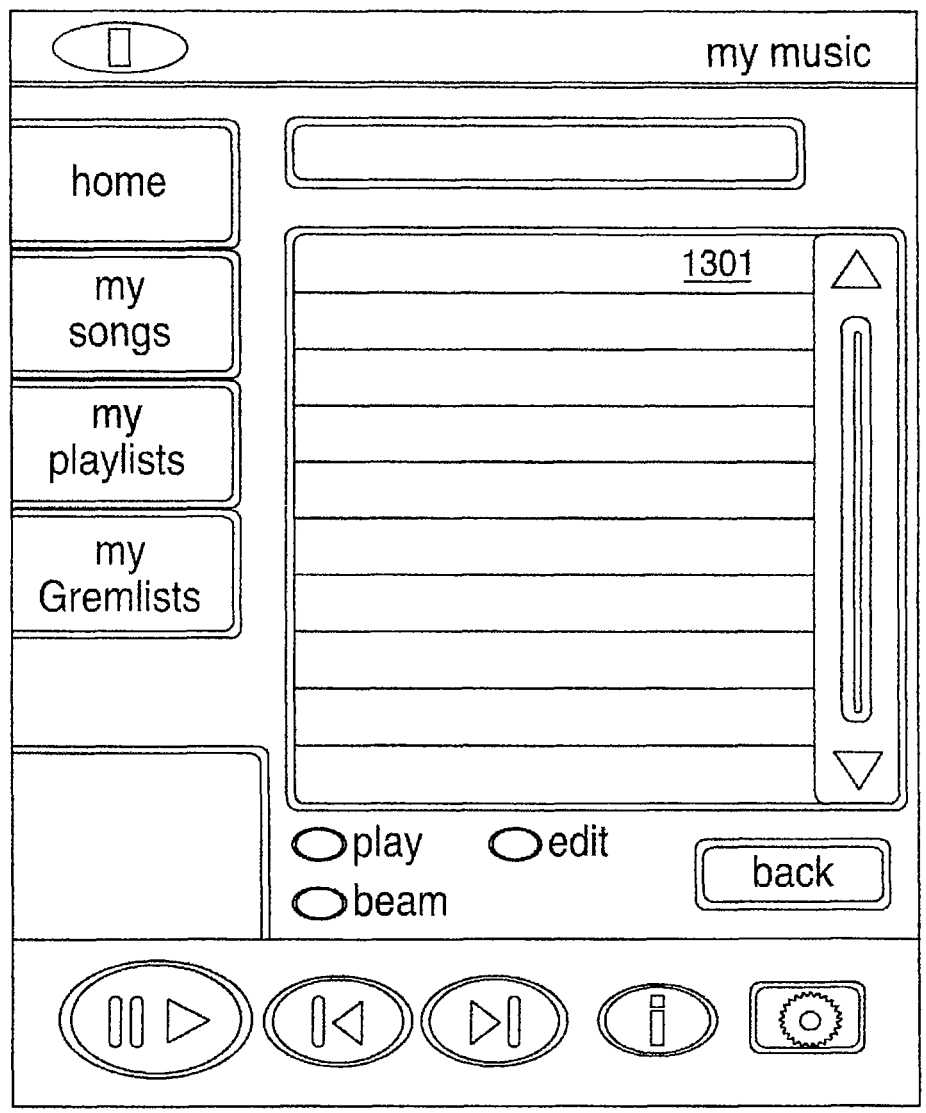
Figure 14:
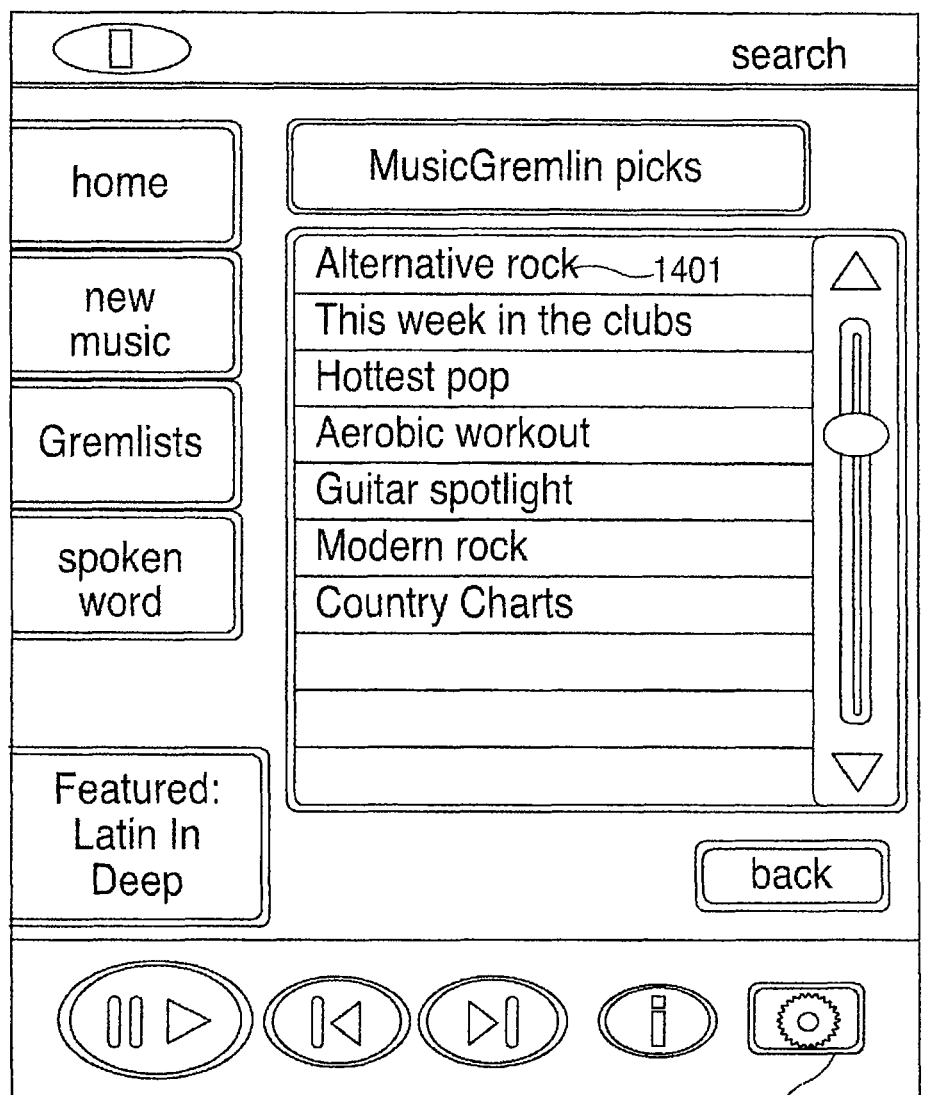
Figure 15:
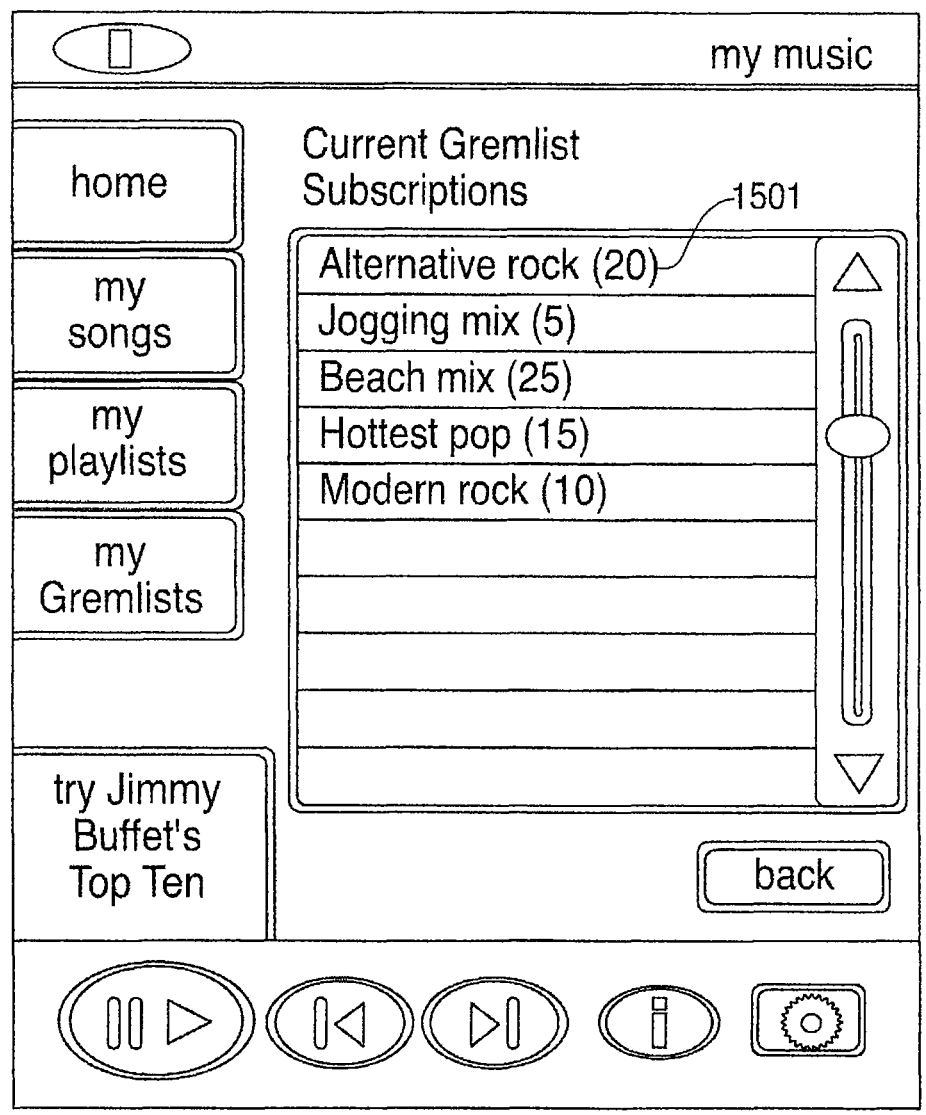
Figure 16:
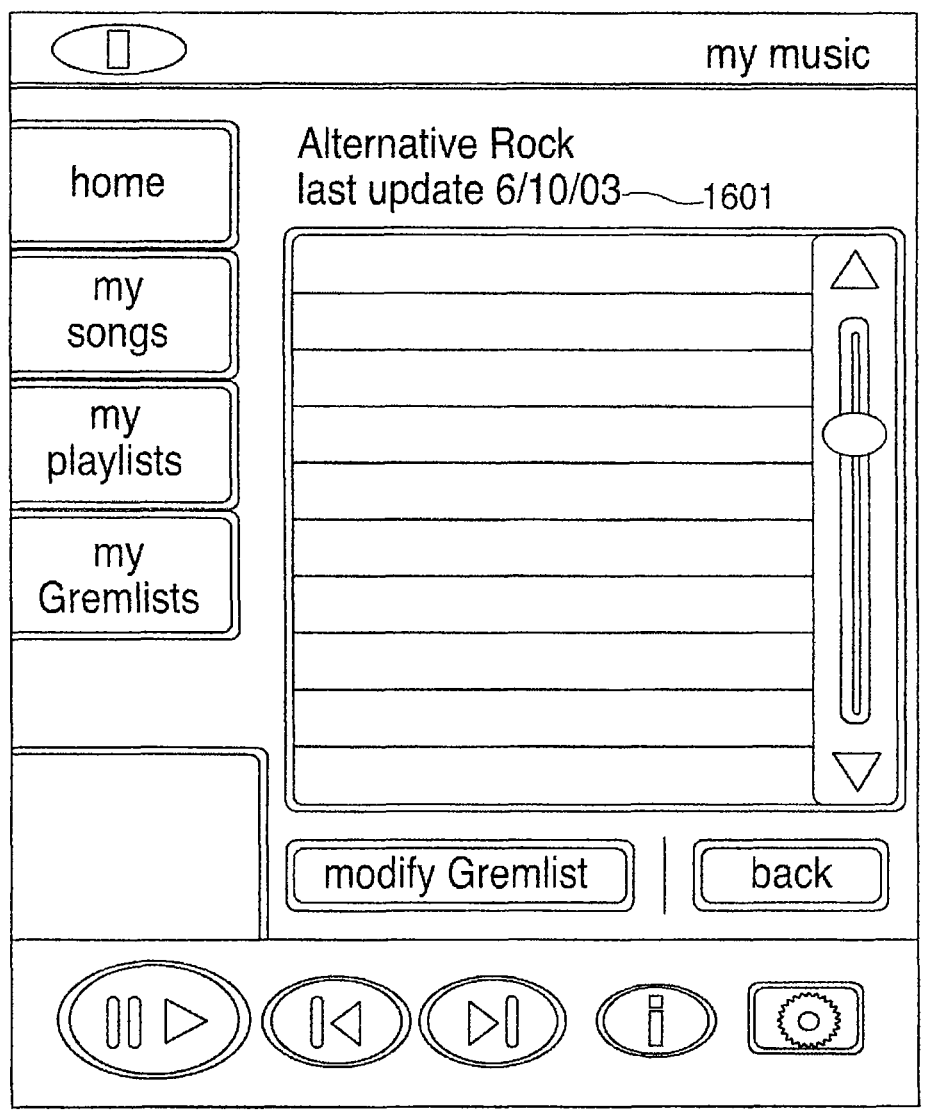
Figure 17:
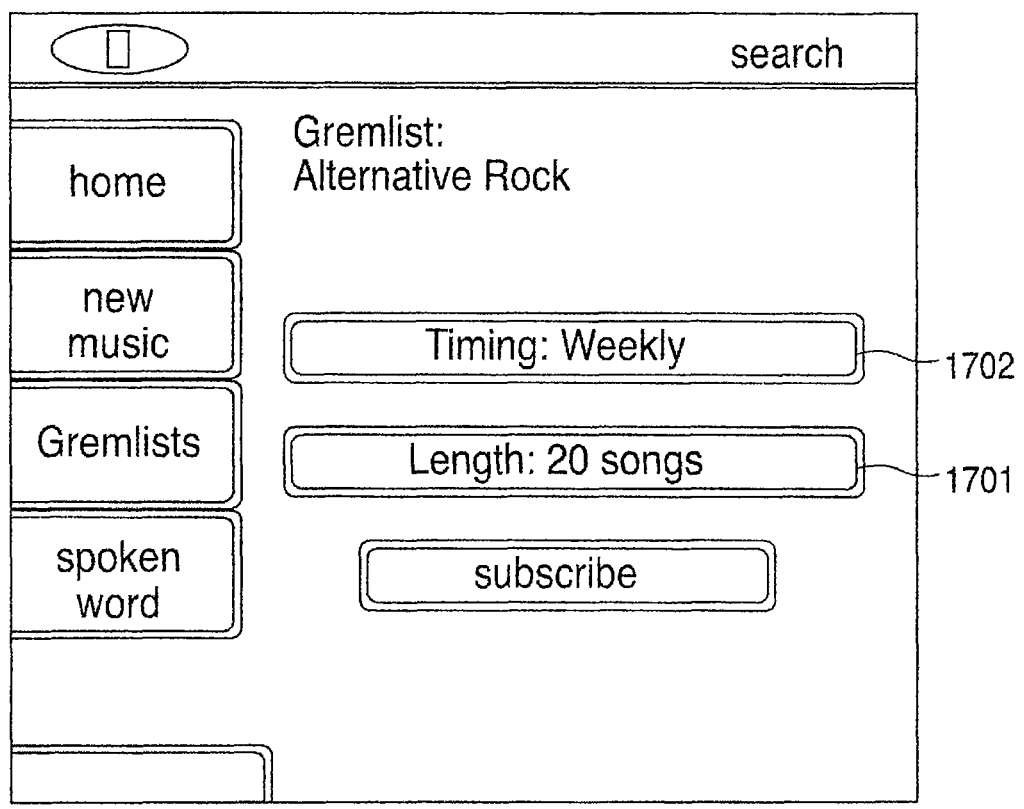

FIGS. 11, 12 and 13 describe certain content management functions that can be performed by a non-technical user without use of a computer or intervening device. A user can rank a selection from 0-5 1101, which ranking can be relayed to the network for aggregation and averaging purposes for display and ranking to users searching for new selections. It can also be used by the user for personal ranking and music prioritization and sorting. A simple menu-driven interface 1102 enables a user to navigate from the home page to a content management page, where the touch-screen allows "drag-and-drop" functionality for creation and modification of stored playlists 1301, FIG. 13.

FIGS. 14, 15, 16 and 17 depict custom delivery of programmed content, which allows a user to specify a taste for particular genres or preferred activity and have continuous commercial-free programming delivered automatically (at periodic Device-Network Synchronizations, invisible to the user), including updated playlists, which can then provide hours of continuous play at the push of the button while still allowing (unlike in the case of broadcast media) the ability to replay content, pause the entertainment, save particular selections to the user's collection, fast-forward/rewind, or skip content selections. "Interactive radio" allows users to subscribe to playlists that are delivered on a scheduled basis—users can search through a variety of lists in multiple ways (e.g. by mood, activity or genre), as shown in 1401. Users then can select lists to play from automatically downloaded playlists 1501. They can play content sequences in order or can change the order, rewind, skip, pause, save, etc. each selection. Users can vary the number of selections in each list delivered FIGS. 16 and 17 1601 and 1701, as well as the frequency of delivery (e.g. daily or weekly).

In FIG. 18 the user can search and browse a variety of lists sorted in various ways. Once delivered, users see their programmed delivery selections, which will automatically continue to deliver content, in a listing in the text box, indicating, in parentheses, the number of content selections included 1501. Users can vary the periodicity and length of the programmed content ordered by toggling easy-to-use buttons 1606.

FIG. 18 also describes the process of programmed media delivery in detail. The network updates a list of available programmed content channels on the device. The user selects from available programmed content channels displayed on the portable device, (e.g., "workout mix," "comedy") specifying frequency of update and number of content files to be delivered per update. Upon the next connection to the network, the device provides this information to the network, which is stored in the subscriber data database.

The network immediately uploads to the device the current version of the requested programmed content list (e.g., "workout mix"), including the file IDs, titles, and content files (including DRM) to the device (a "Programmed Content Delivery"), in a specified order, which may include alternative disc-jockey voice-tracking content and cues interspersed between content selections that are triggered dependent on the current date and time of play, or number of times a particular selection is played. Before a Programmed Content Delivery, the network reviews its subscriber data database to identify any content on the selected playlist which is already resident on the portable player—content already resident will not be re-sent.

The user can access the program and initiate continuous play by pressing the play button. Play may be stopped/paused, fast-forwarded/rewound or skipped/repeated at the user's option at any time. Individual selections may be saved for future use or permanently deleted at the user's option.

Following a network connection after the next periodic interval (e.g., daily or weekly), the network will perform a Programmed Content Delivery, replacing the prior listing of content selections and providing a new list and new content for the user to access in a similar fashion.

Summarizing the above, the present invention preferably provides an apparatus and method of sharing media content by subscribers that is more convenient for users and more secure for content owners, than existing systems. The present invention preferably also allows users who wish to share playlists with other subscribers to do so by transceiving device-to-device a text-based copy of the playlist from one device to the other over a WiFi connection. When the receiving device obtains the playlist, the device automatically contacts the network to confirm that the receiving device has a valid subscription and to download any content selections the receiving device does not already have stored in its memory that are included on the playlist. The device then fully assembles the playlist for the user so that it is playable on demand.

Alternatively, users may share content files by transmitting over a WiFi connection encrypted audio and/or video recordings. The receiving device can browse the content on the first device via a wireless connection to the device and "pull" a selection to the receiving device on-demand, or, alternatively, the transmitting device can choose a selection to "push" to the receiving device. In order to ensure (A) the transmission cannot be intercepted and used illegitimately and (B) the receiving device is validly subscribed, the transmitting device preferably transmits encrypted data and preferably authenticates the receiving device as having a valid subscription pursuant to a Device-Network Synchronization (described in FIG. 4). A preferred embodiment of a lateral transfer process includes: the transmitting device, on receiving a "push" or "pull" request, contacts the network in order to verify that the receiving device has a valid subscription. If so, the network provides, in encrypted form, the private key for the receiving device in order that the transmitting device can then encrypt and securely transmit the audio and/or video data to the receiving device. The transmitting device decodes and uses the private key information to encode any data being sent to the receiving device, which can then decode the audio and/or video data.

In an alternate embodiment of a lateral transfer process, in the event a connection to the network is not available to the transmitting device, the transmitting device can send a request to the receiving device for authentication. If the receiving device has recently been through the procedure outlined in the preceding paragraph, the transmitting device will record this and will not require further verification procedures. If not, the receiving device will then provide data that verifies it having a valid subscription. If the transmitting device verifies this information, it then preferably establishes a new key-based security system with the receiving device. It preferably encrypts the audio and/or video and transmits them to the receiving device over the WiFi communications link. A special flag may also be included in the audio and video data that indicates to the receiving device that the content file may only be playable a limited number of times (e.g., 3 times and then the content expires and is no longer playable). If the receiving device then contacts the network and verifies a valid subscription, the special flag can be removed and the user can access the content as he or she would any other subscription content, without a limitation on the number of listens/viewings possible, and without re-downloading the content to the receiving device.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form, substance and details may be made without departing from the spirit and scope of the present invention. Taken together this makes it more convenient and easier for users to search, obtain, manage and enjoy content, and makes it more secure for content owners to distribute their content to users digitally and at low cost.

Note that scans for a WiFi network, referred to above, through a local access point connected to the Internet can be achieved by the current art, such as by using a Toshiba e755 personal digital assistant with built-in WiFi communications in "infrastructure" mode. Similarly, such a device can perform scans for other WiFi-enabled devices in the absence of any available Internet connection by using an "ad hoc" mode. Connections to available WiFi local access points can be automated through the use of software that automatically initiates a scan and analyzes the results of a scan performed by such a device, identifies an optimal network (e.g., by highest signal strength), uploads required password and ID authentication if stored by the user and establishes a connection. The appropriate process, invisible to the user, is triggered in the present invention based on the desired user function, such as "beaming" a content selection (which requires a connection to a peer device in "ad hoc" mode) or downloading new content from a network (which requires an Internet connection in "infrastructure" mode). Network and peer-to-peer validations and authentications, along with reports from the device counter to the network regarding number of times a content selection was played, times and dates of other events and other data, can be performed in a way that is not visible to the user as a "background" operation, so that simultaneously with these events the user can perform other operations on the portable device, such as listen to music or view videos, and search the metadata database stored locally on the device.

It is further noted that the embodiment of the present invention includes the ability to allow a user, if so desired, to share files of all types without DRM or other security methods over a WiFi connection. Accordingly, the features of the embodiments described herein, which refer to the ability of one device to search and find files on and to transmit files to and receive files from, a peer device can easily be applied, as one experienced in the art would know, to a method of using portable devices to share content across multiple portable wireless devices located in proximity to one another.

As discussed above, a feature of the present invention is that one device can download an audio or video clip (which may have a duration of, for example, 30 seconds) from another, using for example direct download sharing. For this purpose, a user can select an item for download (e.g., "Concerto in G") on the user interface of the device. The request is queued up until a network connection becomes available, either through a wired or wireless interface.

Upon connection, the device sends the request. The server authenticates the device, user, and request. If authenticated, the server sends a sample file of the content that includes DRM (digital rights management).

The device receives the sample file and can allow the user to render (i.e., play) it, enabling the user to sample the content. At that point the user is offered the opportunity to purchase the full file (which may have already been delivered to the device, but its DRM may not be "unlocked" because the "key" for that file has not been provided yet). The key is sent after the user purchases the file.

Rights management can also be embedded into the sample file and limit the rights of the user, per instructions of the content owner. For example, it may allow the user to play it once, or three times, or as much as they like in a 24-hour period, but then no more.

Rights management rules may also specify the sharing rules—e.g., can send the sample file to one friend, who can play it one time, or can send it unlimited times to unlimited friends, or cannot send it at all, or can only send it to other subscribers (e.g., the subscribers of a particular system).

Samples can be shared by other means, such as a P2P connection. When this latter type of connection is used, one user can see the collection of another user in multiple ways. User A can choose to browse User B's song collection by connecting to user B (wirelessly or otherwise) and requesting a list of User B's content files User A can also see a selection from user B if user B decides to "beam" a file to user A. In this case, user A does nothing and user B pushes a file to a user A. User A's device pops up a question, "Would you like to receive this from User B?"

User A and User B can be connected directly through a true P2P wireless (or wired) connection, with no device or network in between (e.g., ad hoc Wi-Fi communications). Alternatively, user A and user B can be connected through a dedicated central server. Each user separately connects to the Internet and is connected via the dedicated back-end system A slight variation on this configuration consists of two users who are connected to the Internet via the same Wi-Fi access point, and communicate directly with each other without going through the Internet (essentially reflecting through the local access point).

When User A obtains a file from User B in any of the manners described above, the software at the dedicated server allows User A to receive a sample file (for example, a re-made 30-second clip) from User B, subject to applicable rights restrictions, rather than the full content file. This is true even though User B has the full file on his player and the user interface doesn't display the sample file to him.

This is accomplished by storing the sample file on User B's player in addition to the full content file, but not listing the sample file in the user interface.

The device redirects a request for a full content file to the sample file stored on User B's player User A is then offered the opportunity to buy the full content file from the central server (and later potentially from User B)

An important feature of the invention is that a device can access and download information and content without a browser.

Other devices use a browser to enable a user to purchase content. This offers numerous advantages. When items get added, deleted, or modified from the available catalog of content selections, this information is changed at the back-end of the independent server. Since users are searching in "real time", they will always be seeing the latest, modified results.

Similarly, purchase price terms and information are always current when using a browser. As these change and are updated, current customers (at the "point of purchase"—i.e., the time they decide to make the purchase) see the most current information.

The devices can be very "dumb"—i.e., thin client model. The devices merely need to place a request to the server and receive back a limited amount of relevant data—e.g., the cost and title, etc. of a piece of content. There is no need for large storage on the device, or complex processing, etc., because all of that happens on the server side.

Without a browser the same features have to be provided. This is not a simple task. The device is portable and has limited processing power and user interface to obtain, manage and render a significant volume of information. These were difficult problems to solve, which we have done:

The device initially receives a complete copy of the available catalog that is stored on the local storage media of the device (e.g., mini hard disc or FLASH).

The format of this copy is important, as it optimizes for performance and storage requirements.

An indexed file is created by the back-end system for each different sort method on the device (e.g., Search by Artist, Search by Album, Search by Composer, Search by Genre, Search by Year . . . ). The index allows for a fast lookup on the device with minimal processing power, even for a large list.

The indexes include lookup pointers for the information that needs to be displayed to the user. For example, the list might say: 35678, 98475, 32412, etc. These numbers then represent text that is displayed to the user, such as "Billy Joel," "Nat King Cole", "Miles Davis", etc., where the numbers represent names. This greatly reduces the size of each indexed file that needs to be stored on the device.

The indexed lists are sent down to the device in small chunks, so that the size of the "packets" of information that need to be transmitted can be sent in a step-wise manner, without requiring time-consuming 50 MB downloads that would be subject to connection breakage and other problems.

This information on the device is subject to "expiration dates" (as well as start dates). This allows the device to know if it is displaying current information to the user, or whether it should require the user to reconnect to the network before seeing information.

For example, a piece of content has a price of $1.00 for the month of January. On January 1 the device begins to display the price of $1.00 until January 31. By February 1 it needs to acquire another update or it will stop displaying $1.00.

This allows us to publish time-based promotions to the device, even if the user doesn't connect for all of January. Changes are processed efficiently.

When there is a change to an existing item listing, or an item is added or deleted, rather than re-sending the whole indexed list (or one portion thereof), we use a combination of re-sending information with sending updates for the device to process itself. Processing updates involves the device performing data re-write operations on the indexes that are stored on the device. The updates are processed in the background, while the user is doing other things, so this is transparent to the user experience.

There are other complications that derive from not having a browser. Connecting to paid access Wi-Fi points (e.g., T-Mobile at Starbucks) is not straight forward. These points generally direct IP communications to a readable HTML Web page. If the device doesn't have a browser, it needs to learn how to navigate around this introduction page. The way it does so is by creating a profile, and simulating the required communications to login and/or bypass this first page.

The device automatically selects a method of connection among multiple possible connections by testing not only whether the connection is live, but also whether it can access dedicated server's back-end test page, verifying that the connection is live AND the device successfully navigated any required logins, etc.

Consummating a purchase transaction on a non-browser, intermittently connected device, involves the following: First, the device asks the user to register. A user must register before they can make any purchase transaction. Two methods of registration can be employed. The first is by a web/telephone. The user provides credit card information and then receives a 6 character "Activation Code" he enters on the device. The Code is then used with a series of hidden computations to create a secure "deviceID" that is used to identify the device to the user account on an ongoing basis. Each Activation Code is unique and created by the dedicated server's back-end system. For further protection, the code is only allowed to be entered within a 48 hour period, or else it expires—this makes it even more difficult for people to simply "guess" at valid Activation Codes.

The second method is directly on the device. The user enters his name, etc., including credit card information, on the device. This information is temporarily stored in encrypted form on the device. Whenever the device next connects, it sends this information through the network (including a secure PIN, and the Activation Code referenced above). If the information is valid, the user is registered and an account is created. The information is sent over HTTPS, so is secure, and is then deleted from the device and not stored there ever again.

Once a user is registered, he can make purchases. When he makes selections, the device logs the selected request (assuming the pricing information has not expired when he made his purchase decision). When the device connects to the network, the purchase is processed, and the content is sent. The user sees the charge on his next credit card bill.

Alternatively, users can purchase credits in advance, and these are charged against the user when he makes purchases.

For subscription, a recurring charge to the credit card is established. On valid purchase, a renewal to the digital rights is provided. Changes to user interface, special messages to the user and other items are difficult without a browser.

The dedicated server generates and sends messages to any or all devices (to the "Inbox" on the device, or to various specified locations throughout the user interface, such as the popup box for purchases). The dedicated server also updates software of the device, which includes making changes to the user interface of the device, adding new features, removing features, etc. Unlike other devices, these messages and changes are stored on the device and remain there until any further updates that may change them.

Numerous modifications may be made to the invention without departing from its scope as defined in the appended claims.

The invention claimed is:

1. A wireless portable device comprising:
an antenna;
an input device operative to receive audio and/or video; and
a processor in communication with the antenna and the input device, wherein the processor is operative to:
create a digital version of the audio and/or video received from the input device;
store the digital version of the audio and/or video on the wireless portable device;
detect other wireless portable devices that are available to wirelessly communicate with the wireless portable device and are not set to avoid such detection;
display a list of one or more of the detected wireless portable device(s);
receive a selection of one of the one or more of the detected wireless portable device(s); and
wirelessly transmit the digital version of the audio and/or video via the antenna to the selected one of the one or more of the detected wireless portable device(s) without use of an intervening desktop or laptop computer.

2. The wireless portable device of claim 1, wherein the input device comprises a microphone.

3. The wireless portable device of claim 1, wherein the input device comprises a video camera.

4. The wireless portable device of claim 1, wherein the digital version of the audio and/or video is wirelessly transmitted as a digital media file in an email addressed to an email address.

5. The wireless portable device of claim 1, wherein the digital version of the audio and/or video is wirelessly transmitted as a digital media file in an instant message addressed to an instant message address.

6. The wireless portable device of claim 1, wherein the processor is further operative to encrypt the digital version of the audio and/or video.

7. The wireless portable device of claim 1, wherein the processor is further operative to compress the digital version of the audio and/or video.

8. The wireless portable device of claim 1, wherein the digital version of the audio and/or video is limited in length.

9. The wireless portable device of claim 1 further comprising:
a display device; and
a touch-sensitive layer on the display device;
wherein the processor is further operative to display selection areas on the display device, wherein the selection areas are sufficiently large to be selectable via the touch-sensitive layer by a user's fingertip.

10. The wireless portable device of claim 1, wherein the processor is operative to wirelessly transmit the digital version of the audio and/or video without using a browser.

11. A wireless portable device comprising:
an antenna;
an input device operative to receive audio and/or video;
a display device;
a touch-sensitive layer on the display device; and
a processor in communication with the antenna, input device, display device, and touch-sensitive layer, wherein the processor is operative to:
create a digital version of the audio and/or video received from the input device;
store the digital version of the audio and/or video on the wireless portable device;
detect other wireless portable devices that are available to wirelessly communicate with the wireless portable device and are not set to avoid such detection;
display a plurality of selection areas on the display device, wherein each selection area is sufficiently large to be selectable via the touch-sensitive layer by a user's fingertip, wherein the plurality of selection areas include a list of one or more of the detected wireless portable device(s);
receive a selection of a detected wireless portable device via selection of the displayed plurality of selection areas; and
wirelessly transmit the digital version of the audio and/or video as a digital media file to the selected detected wireless portable device without use of an intervening desktop or laptop computer.

12. The wireless portable device of claim 11, wherein the digital version of the audio and/or video is wirelessly transmitted as a digital media file in an email.

13. The wireless portable device of claim 11, wherein the digital version of the audio and/or video is wirelessly transmitted as a digital media file in a message.

14. The wireless portable device of claim 13, wherein the digital version of the audio and/or video is wirelessly transmitted as a digital media file in an instant message.

15. The wireless portable device of claim 11, wherein the input device comprises a microphone.

16. The wireless portable device of claim 11, wherein the input device comprises a video camera.

17. The wireless portable device of claim 11, wherein the processor is further operative to encrypt the digital version of the audio and/or video.

18. The wireless portable device of claim 11, wherein the processor is further operative to compress the digital version of the audio and/or video.

19. The wireless portable device of claim 11, wherein the digital version of the audio and/or video is limited in length.

20. The wireless portable device of claim 11, wherein the processor is operative to wirelessly transmit the digital version of the audio and/or video without using a browser.

* * * * *

UNITED STATES PATENT AND TRADEMARK OFFICE
CERTIFICATE OF CORRECTION

| | | |
|---|---|---|
| PATENT NO. | : 9,081,781 B2 | Page 1 of 1 |
| APPLICATION NO. | : 13/214846 | |
| DATED | : July 14, 2015 | |
| INVENTOR(S) | : Robert K. Khedouri et al. | |

It is certified that error appears in the above-identified patent and that said Letters Patent is hereby corrected as shown below:

In the Claims

In column 29, line 48, claim 1, immediately after "portable device(s)" replace "without use of an intervening" with --, wherein the wireless portable device is configured to wirelessly transmit the digital version while being disconnected from a--.

In column 30, line 40, claim 11, immediately after "portable device" replace "without use of an intervening" with --, wherein the wireless portable device is configured to wirelessly transmit the digital version while being disconnected from a--.

Signed and Sealed this
Twenty-sixth Day of January, 2016

Michelle K. Lee
*Director of the United States Patent and Trademark Office*